United States Patent [19]
Saito et al.

[11] Patent Number: 5,948,473
[45] Date of Patent: Sep. 7, 1999

[54] METHOD AND APPARATUS FOR PREPARING RESIN-IMPREGNATED STRUCTURES REINFORCED BY CONTINUOUS FIBERS

[75] Inventors: Koichi Saito; Rikio Yonaiyama; Yasuhiro Sakai; Masanori Ishikawa, all of Ichihara, Japan

[73] Assignee: Chisso Corporation, Osaka, Japan

[21] Appl. No.: 09/077,596

[22] PCT Filed: Nov. 25, 1996

[86] PCT No.: PCT/JP96/03449

§ 371 Date: May 29, 1998

§ 102(e) Date: May 29, 1998

[87] PCT Pub. No.: WO97/19805

PCT Pub. Date: Jun. 5, 1997

[30] Foreign Application Priority Data

Nov. 30, 1995 [JP] Japan ...................................... 7-336177

[51] Int. Cl.[6] .............................. B05D 1/18; B05C 3/172
[52] U.S. Cl. .................. 427/289; 427/434.4; 427/434.7; 118/405; 118/420; 156/296; 156/441
[58] Field of Search ............................. 427/434.4, 434.7, 427/289; 118/405, 420; 156/296, 441

[56] References Cited

U.S. PATENT DOCUMENTS

| | | | |
|---|---|---|---|
| 4,312,917 | 1/1982 | Hawley | 428/375 |
| 4,549,920 | 10/1985 | Cogswell et al. | 156/181 |
| 4,559,262 | 12/1985 | Cogswell et al. | 428/294 |
| 4,640,861 | 2/1987 | Binnersley et al. | 428/294 |
| 4,720,366 | 1/1988 | Binnersley et al. | 264/172 |
| 4,728,387 | 3/1988 | Hilakos | 156/441 |
| 4,864,964 | 9/1989 | Hikalos | 118/117 |
| 4,883,625 | 11/1989 | Glemet et al. | 264/136 |

FOREIGN PATENT DOCUMENTS

| | | |
|---|---|---|
| 63-132036 | 6/1988 | Japan . |
| 4278311 | 10/1992 | Japan . |
| 6091645 | 4/1994 | Japan . |
| 6143440 | 5/1994 | Japan . |
| 6254857 | 9/1994 | Japan . |

*Primary Examiner*—Katherine A. Bareford
*Attorney, Agent, or Firm*—Leydig, Voit & Mayer, Ltd.

[57] ABSTRACT

The present invention relates to a method for producing a resin-impregnated structure reinforced by continuous fibers in which a practically endless continuous fiber bundle is dipped in a bath of molten resin and simultaneously passes through a space between a pair of opening pins. The opening pins can be positioned on sides of the bundle so that the continuous fibers are sandwiched by the pins without coming in contact with them. By doing so, the fibers of the bundle can be opened and can be impregnated with the resin. In addition, the foregoing continuous fiber-reinforced resin structure may be cut into pieces having a desired length to provide columnar products.

17 Claims, 6 Drawing Sheets

METHOD AND APPARATUS FOR PREPARING RESIN-IMPREGNATED STRUCTURES REINFORCED BY CONTINUOUS FIBERS

This is a national stage application of PCT/JP96/03449, filed Nov. 25, 1996.

TECHNICAL FIELD

The present invention relates to a method for preparing a resin-impregnated structure, which comprises opening a bundle of substantially endless continuous fibers and then impregnating the resultant open bundle with a resin; a method for producing columnar products from the resin-impregnated structure thus prepared; and an apparatus for opening a bundle consisting of continuous fibers and, simultaneously, impregnating it with a resin.

BACKGROUND ART

There have already been known a number of methods and apparatuses for producing a resin-impregnated structure reinforced with continuous fibers by contacting, in a zigzag pattern, a continuous fiber bundle serving as a reinforcing material with the surfaces of a plurality of opening means arranged in series within an apparatus for opening and resin-impregnation (or by making them run around the means) and simultaneously impregnating the opened (or loosed) continuous fibers with a molten resin. For instance, a variety of techniques are disclosed in the patent publication listed below.

It can be understood from the disclosures thereof that continuous fiber bundles are brought into contact with (opening) pins or (opening) rolls for opening and resin-impregnation of the continuous fiber bundle, in either of these techniques. It has been proven that, as a result, the continuous fibers are damaged to a substantial extent, that this in turn leads to the formation of fluff and that it is thus difficult to stably produce resin-impregnated structures reinforced with continuous fibers. Each publication will hereinafter be described in more detail.

(R1) Japanese Patent Publication No. 63 (1988)-37694 (gazetted specification) and the Related Written Decision (Trial Case No. 2 (1990)-17153).

The gazetted specification and the written decision disclose or propose a method which comprises passing, under tension, reinforcing fiber bundles arranged in a band-like pattern through a spreader while bringing the bundles into contact with the surface of the spreader, and while supplying a thermoplastic polymer having a melt viscosity of less than 100 Ns/m$^2$ to a nip formed between the reinforcing fiber bundles and the spreader, to thus impregnate the fiber bundles with the polymer.

(R2) Japanese Patent Laid-Open Publication No. 63 (1988)-264326 (gazetted Specification)

In this gazetted specification, there is proposed a method for impregnation, which comprises arranging or spreading fiber bundles in a web-like (this term is identical to "band-like") pattern, then coating the bundles with a molten resin and thereafter passing the coated fiber bundles through a specific zigzag barrier region within an apparatus for opening and resin-impregnation.

(R3) Japanese Examined Patent Publication No. 5 (1993)-68327 (gazetted specification)

This gazetted specification proposes a method for impregnation, which comprises extruding a molten resin through the tip of a bow head of an extruder and simultaneously passing a series of fibers, under tension, through the bow head while bringing the fibers into contact with the bow head.

(R4) Japanese Patent Laid-Open Publication No.4 (1992)-278311 (gazetted specification)

This gazetted specification proposes an impregnation method in which a choking structure is provided in the course of a flow path for fibers in an apparatus for opening and resin-impregnation and the fibers are brought into contact with the choking structure to thus subject the fibers to opening and to simultaneously impregnate them with a resin.

<Inventors' View on (R1) to (R4)>

These methods can certainly provide resin-impregnated structures uni-directionally reinforced, which are excellent in resin-impregnation ability. In all of these methods, however, the fibers would severely be damaged since the reinforcing fiber bundles pass through (around) pins or projected portions while bringing the bundles into contact with the pins or projections. It has been found that, as a result, the methods have a problem that fluffs are easily formed due to breakage of fibers. The formation of fluffs would impair any stable productivity of the intended resin-impregnated structure and ultimately leads to the interruption of the apparatus for opening and resin-impregnation.

(R5) Japanese Patent Laid-Open Publication No. 6 (1994)-254857 (gazetted specification)

This gazetted specification proposes an impregnation method which comprises pressing fiber bundle through a die box while pressing it against rotatable rolls positioned within the die box in a zigzag pattern to thus induce opening of the fiber bundle and then supplying a resin to opened the fibers, to thereby impregnating it with the resin.

This method is designed so as to reduce the damage to the fibers by rotating the rolls, and permits an increase in the take-off speed to a certain extent (20 m/min). As a result of investigations, however, the fiber bundles are likewise brought into contact with the rolls (or pressed against the rolls), while applying a tension thereto in this method as well. Accordingly, it has been found that this method is accompanied by the easy formation of fluffs and that it is still difficult to ensure stable productivity.

(R6) Japanese Patent Laid-Open Publication No. 6 (1994)-91645 (gazetted specification)

This gazetted specification proposes an impregnation method which comprises supplying fiber bundles to an S-shaped die so that the fiber bundles pass through (around) the projected portions in the S-shaped region under the action of a tension while bringing the bundles into contact therewith and simultaneously discharging a molten resin through discharge openings formed on the tips of the projected portions to thus stepwise impregnate the bundles at three positions.

(R7) Japanese Patent Laid-Open Publication No. 6 (1994)-143440 (gazetted specification)

This gazetted specification proposes an impregnation method which comprises heating the reinforcing fibers in advance, then coating them with a molten resin and passing the fibers through (around) at least 8 projected portions which are arranged alternately while bringing the fibers into contact therewith.

It has been said that these methods described in references (R6) and (R7) permit the achievement of a take-off speed of not less than 20 m/min because of the improved means such as the means for stepwise impregnation of the reinforcing fibers and for heating the fibers in advance.

However, it has been found that these methods are often accompanied by the formation of fluffs. Therefore, it is difficult to ensure stable productivity. This would be because the fiber bundles are passed through (around) the projected portions under tension thereto while bringing the bundles into contact therewith.

(R8) Japanese Patent Laid-Open Publication No. 63 (1989)-132036 (gazetted specification)

This gazetted specification proposes an impregnation method which comprises mechanically impregnating reinforcing fiber bundles with a resin by supplying the fiber bundles provided with the resin to the space formed between upper and lower rolls within an apparatus for opening and resin-impregnation to thus press the bundles.

(R9) Japanese Patent Laid-Open Publication No. 1 (1989)-208118 (gazetted specification)

This gazetted specification proposes an impregnation method which comprises mechanically impregnating reinforcing fiber bundles with a resin by pressing the fiber bundles provided with the resin using upper and lower rolls, i.e., a combination of a convex roll and a concave roll, within an apparatus for opening and resin-impregnation.

With respect to (R8) and (R9) in each of the foregoing techniques, both of the opening of continuous fiber bundles and the impregnation of the resulting opened fiber bundles with a resin are performed by the compressive force acting on the bundles only at the contact point between the upper and lower rolls and accordingly, the contact time between the fibers and the rolls is quite short even if using at least two pairs of rolls. As a result, it has been found that there still remains room for improvement in the impregnating ability. In addition, the fiber bundles are directly pressed by upper and lower rolls, the bundles are thus severely damaged during the opening thereof. As a result, it has been found that the fibers undergoes form fluffs and productivity is lowered.

DISCLOSURE OF THE INVENTION

The object of the present invention is to eliminate various disadvantages associated with the foregoing conventional techniques and to provide a technique for continuously producing a continuous resin-impregnated structure reinforced with continuous fibers at a high take-off speed while maintaining high level of stable productivity. More specifically, the object of the present invention is to provide a production method (hereinafter sometimes referred to as the method of the present invention") as well as an apparatus for practicing the method of the present invention (hereinafter sometimes referred to as "the apparatus of the present invention").

According to the present invention, there is provided a method for producing a resin-impregnated structure reinforced by continuous fibers substantially arranged in a single direction, which comprises subjecting a practically endless continuous fiber bundle to an opening, while impregnating the bundle with a molten resin, wherein the continuous fiber bundle is dipped in a bath of a molten resin and, simultaneously, the continuous fiber bundle passes through the interstice (space) formed between a pair of opening pins positioned on both sides of the bundle in such a manner so that they sandwich the continuous fibers without bringing the latter into contact with either of the pins to thereby subject the fibers to opening and impregnation of the opened fiber bundle.

According to another aspect of the present invention, there is also provided a method for producing a columnar product composed of a resin-impregnated structure reinforced by continuous fibers, which is reinforced by substantially uni-directionally arranged continuous fibers and which is produced by subjecting a practically endless continuous fiber bundle to an opening, while impregnating the bundle with a molten resin, wherein the continuous fiber bundle is dipped in a bath of a molten resin and simultaneously passes through the interstice (space) formed between a pair of opening pins positioned on both sides of the bundles in such a manner that they sandwich the continuous fibers without bringing the latter into contact with either of the pins, to thereby subject the fibers to opening and impregnation of the opened fiber hundle with a resin and then the resulting resin-impregnated structure reinforced with unidirectionally arranged continuous fibers is cut into pieces having a desired length.

According to a still another aspect of the present invention, there is provided an apparatus for producing a resin-impregnated structure reinforced by continuous fibers (an apparatus for opening and resin-impregnation) which comprises reinforcing fibers uni-directionally arranged and a resin present therebetween, wherein the apparatus at least comprises:

a zone through which a molten resin formed form a molten resin-supply system flows, said molten resin being supplied to the zone through a pore for introduction and being stored therein in a predetermined amount;

an opening for introducing a continuous fiber bundle, said openings being positioned on an end wall or a top plate arranged on the upstream side of the zone;

at least one pair of opening pins which are approximately perpendicularly positioned within the zone so that the continuous fiber bundle introduced therein is immersed in the molten resin and passed therethrough without coming in contact with the pins;

a shape-determining nozzle positioned on the downstream side along the moving direction of the continuous fiber bundle for drawing the fiber bundle introduced from the opening for introduction to out of the zone while passing the bundle through the space formed between the pair of opening pins without bringing them into contact with the pins; and a take-off system for the resin-impregnated structure reinforced by the continuous fibers, which has drawn from the shape-determining nozzle.

According to a still further aspect of the present invention, there is provided an apparatus for producing a resin-impregnated structure reinforced by continuous fibers (an apparatus for multiple opening and resin-impregnation) which comprises continuous reinforcing fibers uni-directionally arranged and a resin present therebetween, wherein the apparatus at least comprises:

a zone through which a molten resin formed in a molten resin-supply system flows, said molten resin being supplied to the zone through a pore for introduction and being stored therein in a predetermined amount;

at least two openings for introducing continuous fiber bundles, said openings being positioned on an end wall or a top plate arranged on the upstream side of the zone for immersion;

at least three opening pins which are approximately perpendicularly positioned within the zone so that the continuous fiber bundles introduced therein are immersed in the molten resin and passed therethrough without coming in contact with the pins;

a shape-determining nozzle positioned on the downstream side along the moving direction of the continuous fiber bundles so as to draw the fiber bundles introduced through the openings for introduction out of the zone while passing the bundles through the spaces formed between the opening pins without bringing them into contact with the pins; and a take-off system for the resin-impregnated structure reinforced by the continuous fibers, which has drawn from the shape-determining nozzle.

DETAILED DESCRIPTION

The method for producing a resin-impregnated structure reinforced by continuous fibers, the method for producing a columnar products composed of the resin-impregnated structure reinforced by continuous fibers, and the apparatus used for producing the resin-impregnated structure according to the present invention will specifically be described below.

First of all, the method for producing a resin-impregnated resin structure reinforced by continuous fibers (hereinafter, sometimes referred to as continuous fiber-reinforced structure) according to the present invention will be explained with reference to FIG. 1.

Figure 1:
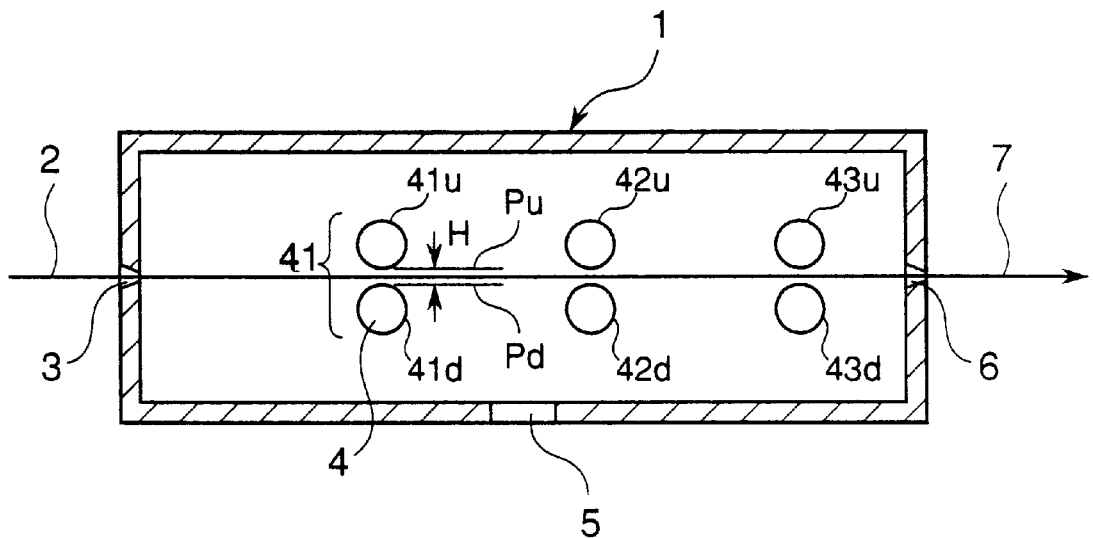
FIG. 1 shows an embodiment for producing a resin-impregnated structure (resin-impregnated structure reinforced by continuous fibers) which is reinforced with uni-directionally arranged continuous fibers and produced by the method of the present invention and is a schematic vertical cross sectional view of an apparatus according to a first aspect of the present invention wherein a continuous fiber roving is introduced into the apparatus through an opening for introducing a continuous fiber bundle positioned on the end wall on the upstream side of the apparatus according to the first aspect.

FIG. 1 is a schematic vertical cross sectional view of an apparatus (an opening and resin-impregnation apparatus according to a first aspect of the present invention) used for producing a resin-impregnated structure reinforced with uni-directionally arranged continuous fibers, i.e., a continuous fiber-reinforced resin structure.

In FIG. 1, reference numeral 1 stands for the first opening and resin-impregnation apparatus which is provided with an opening 3 for introducing a continuous fiber bundle 2 into the apparatus 1 on the end wall on the upstream side with respect to the moving direction of the fiber bundle 2; and a shape-determining nozzle 6 positioned on the other end wall on the downstream side with respect to the moving direction of the continuous fiber bundle 2 in order to draw a continuous fiber-reinforced resin structure 7 which has been subjected to opening and impregnated with a resin out of the apparatus 1.

In the apparatus 1 shown in FIG. 1, the continuous fiber bundle-introduction opening 3 and the shape-determining nozzle 6 are formed in such a manner that the continuous fiber bundle 2 does not come in contact with any opening pin 4 arranged within the apparatus 1 when the fiber bundle 2 is subjected to opening and resin-impregnation during passing through the apparatus 1 to thus convert the fiber bundle into the continuous fiber-reinforced resin structure 7.

The continuous fiber bundle-introduction opening 3 used in the apparatus 1 preferably has a dimension and a shape which conforms to or corresponds to those of the cross section of the continuous fiber bundle 3, i.e., an oblong rectangle. In addition, if the use of one continuous fiber bundle is insufficient in the continuous fiber content of the resulting continuous fiber-reinforced resin structure, a plurality of continuous fiber bundles 2 arranged lateral and parallel to one another can be introduced into this apparatus 1. In such case, the fiber bundle-introduction opening 3 is preferably shaped in an oblong rectangle so that it is adapted for the cross sectional shape of the fiber bundles laterally arranged in a row.

In the first opening and resin-impregnation apparatus 1, the molten resin formed in a molten resin-supply system (not shown) is introduced into the first apparatus 1 through an introduction opening 5 formed on the apparatus 1. An extruder is in general used as such a molten resin-supply device and commonly used is a screw extruder among others. Various kinds of screw extruders may be used herein and may be either a single-screw extruder or a multiple-screw extruder such as twin-screw extruder.

The continuous fiber bundle 2 which is introduced into the apparatus 1 through the continuous fiber bundle-introduction opening 3 of the apparatus 1 shown in FIG. 1 is "substantially endless". This means that the continuous fiber bundle 2 has a shape called a roving when supplied to the apparatus 1, but, in fact, the length of the roving is of course finite and is not a relatively short one having a length of not more than about 1 m.

In the operation of the apparatus, the final portion of a reel of glass fiber roving (2) may be entangled with and connected to the initial portion of the subsequent roving at a stage immediately before the complete consumption of the first reel of roving to thus continue the operation of the apparatus over a long period of time.

The continuous fiber bundle (2) which is opened according to the method of this invention includes inorganic continuous fiber bundles, organic continuous fiber bundles and composite continuous fiber bundles comprising inorganic and organic fiber bundles.

Among inorganic continuous fiber bundles, most commonly used are glass fibers and E glass belonging to the silicate has often been used as a raw glass material therefor. However, the raw glass material is not restricted to this specific one and examples thereof of course include fibers comprising potash glass, heat-resistant glass such as borosilicate glass and quartz glass which may be selected depending on the applications. Other inorganic fibers include, for instance, metal fibers, rock wool and carbon fibers.

On the other hand, examples of organic continuous fibers are all-aromatic polyamide (trade name: Aramid or the like) fibers, all-aromatic polyester (trade name: Kevlar) fibers or Nylon MXD6 (copolymer of m-xylylenediamine and adipic acid), which are excellent in physical properties such as tensile strength, bending (flexural) strength, tensile impact strength and heat resistance (high melting point).

These inorganic and organic continuous fibers are used not only as single fibers, but also in the form of rovings each obtained by binding a plurality of single fibers into a bundle with a binder.

The present invention will further be explained with glass continuous fibers, as an example, which have in general been widely used, but other continuous fibers as reinforcing materials may be used in the manner identical to that adopted for the glass continuous fiber, except for cases wherein particular requirements should be satisfied.

Glass continuous fibers used in the present invention as reinforcing materials for resins are usual glass rovings and suitably have an average fiber diameter ranging from 6 to 30 $\mu$m and a number of bundled fibers ranging from 500 to 6000; preferably an average fiber diameter ranging from 9 to 23 $\mu$m and a number of single fibers (bundled fibers) ranging from 1000 to 4000. At least two such glass rovings may be used after subjecting them to yarn doubling, depending on the application. The length of the reinforcing fiber present in the continuous fiber-reinforced resin structure produced by using the opening and resin-impregnation apparatus 1 according to the present invention is approximately identical to that of the continuous fiber-reinforced resin structure. In other words, the continuous fiber-reinforced resin structure 7 is produced by subjecting a substantially endless continuous fiber bundle 2 to opening and impregnation with a resin, and then subjecting it to pultrusion so that the length of the fibers in the resulting structure are in general identical to that of the structure.

Incidentally, the continuous fiber bundle 2 thus introduced into the opening and resin-impregnation apparatus 1 is opened as it is moved towards the downstream direction while being gradually converted into almost single fibers. The concept of the term "continuous fiber" herein used generally comprehends "continuous fiber bundle" which is introduced into the opening and resin-impregnation apparatus 1 and the "continuous fibers" which are in the course of the principal opening stage.

As the molten resin which is charged into the opening and resin-impregnation apparatus 1 and is used for impregnating the continuous fibers 2 while the continuous fiber bundles 2 are subjected to opening, a thermoplastic resin can suitably be used. Examples of such thermoplastic resins usable herein are crystalline thermoplastic resins such as polyolefin resins, polyamide resins (nylons) and polyester resins. These crystalline thermoplastic resins may be used alone or in any combination thereof. Among these crystalline thermoplastic resins, preferred are polyolefin resins for the usual applications from the viewpoint of their properties and prices. The concept of the term "polyolefin resin" herein used comprehends, for instance, crystalline homopolymers or copolymers of $\alpha$-olefins usually having about 2 to 10 carbon atoms; compositions each comprising at least two such crystalline homopolymers; compositions each comprising at least two such crystalline copolymers; or compositions each comprising at least one such crystalline homopolymer and at least one such crystalline copolymer.

Examples of $\alpha$-olefins having 2 to 10 carbon atoms include ethylene, propylene, 1-butene, 1-pentene, 1-hexene, 4-methyl-1-pentene, 1-octene and 1-decene, which may be homopolymerized or at least two of which may be copolymerized.

Among these crystalline polyolefins (so-called "poly-$\alpha$-olefins"), crystalline polypropylene resins are most widely used from the viewpoint of practical use. Moreover, if the continuous fiber-reinforced resin structure produced according to the present invention is used at a low temperature, preferred are polyethylene resins rather than polypropylene resins, while if it is used under high temperature conditions, suitably used are poly-4-methyl-1-pentene resins.

Furthermore, if it is used under conditions wherein the temperature is higher than 200° C., suitably used are various kinds of polyamide resins or polyester resins having high heat resistance. Examples of polyamide resins usable herein are ring opening-addition polymerized type nylons such as 6-nylon and poly-condensed type nylons such as 6,6-nylon. In addition, if the structure must have more higher heat resistance, there have been used, for instance, semi-aromatic polyamide resins or all-aromatic polyamide resins (aramid resins). Examples of preferred semi-aromatic polyamide resins are copolycondensed polymers of m-xylylenediamine and adipic acid (so-called "nylon MXD6") and examples of preferred all-aromatic polyamides are copolycondensed polymers of m-xylylenediamine and terephthalic acid (for instance, those distributed under the trade name of "Kelimide").

In addition, the polyesters (resins) used in the present invention are copolycondensates of aliphatic diols and aromatic dicarboxylic acids and most usually used are, for instance, copolycondensates of ethylene glycol (or "ethylene oxide (oxilane)) with terephthalic acid ("polyethylene terephtalates" (abbreviated as "PET")). Examples of polyesters having more higher heat resistance are copolycondensates of terephthalic acid wherein 1,4-butanediol is substituted for ethylene glycol as the aliphatic diol component ("poly-1,4-butanediol terephthalate" (abbreviated as "PBT")).

The foregoing first opening and resin-impregnation apparatus 1 is provided with at least one pair of opening pins 41 arranged therein at desired distances so that the continuous fiber bundle 2 is not brought into contact with these pins.

The fixed opening pins 4 constituting the paired opening pins 41 have elements and properties suitable for functioning, so that the flow of the resin entrained by the continuous fiber bundle 2 is dammed up to thus generate a turbulent flow of the resin. In FIG. 1, the apparatus is provided with fixed opening pins each having a circular cross-section perpendicular to the longitudinal axis of the opening pin 4. In addition to the foregoing circular shape, the sectional shape of the fixed opening pins 4 may be, for instance, a triangular or quadrangular shape wherein the tip thereof may be cut off and rounded to give a convex polygonal shape such as a so-called "rounded polygonal shape". In this regard, the cross-sectional shape may likewise be a polygonal shape having rather a large number of apexes such as pentagonal, hexagonal or octagonal shape among others or effectively used herein are polygonal shapes having cross sectional shapes which permit the damming up of the resin flow by the widest possible area of the pin.

The pin may have a polygonal cross-section such as hexagonal, octagonal or dodecagonal one whose apexes (or edges) portions are rounded off, i.e., a cross-section of a so-called "rounded polygonal shape", in addition to the circular shape. Thus, the pin may have a cross-sectional shape which permits the damming up of the resin flow by the widest possible area of the pin.

The surface of the fixed opening pin 4 is not needed to be finished to a particularly smooth one and the degree of surface smoothness attained by simply cutting a rod with, for instance, a lathe. A lathe may be sufficient in most of cases. Incidentally, in cases wherein fixed opening pins 4 having a triangular cross section is adopted, an angle bar may be substituted for the body cut out from a rod by arranging such that the edge thereof serves as the top edge (i.e., in the form of a roof).

FIG. 1 shows an embodiment which includes three opening regions within the apparatus 1 comprising three sets of paired opening pins 41 each pair comprising fixed opening pins 41$u$ and 41$d$, opening pins 42$u$ and 42$d$ or fixed opening pins 43$u$ and 43$d$ which make corresponding opening pin pairs 41.

The paired opening pins 41 are arranged starting from the upstream side along the moving direction of the continuous fiber bundle 2 so that fixed opening pins 4 which make a pair are positioned at the upper and lower side of the continuous fiber bundle, which pins 41 are approximately perpendicular to the running direction of the fiber bundle. These opening pins 4 are in general fixed to a side wall (not shown) of the opening and resin-impregnation apparatus 1, which wall is approximately perpendicular to the running direction of the fiber bundle and is parallel to the moving direction of the continuous fiber bundle 2.

In the opening and resin-impregnation apparatus according to the present invention, the terms "upper and lower, right and left and in front and in rear" or the like are simply used for convenience of the explanation of the present invention with referring to the accompanying drawings and do not represent any absolute relation of positions in the apparatus 1.

Moreover, the term "opening stage" herein used means the stage extending from the position at which the continuous fiber bundle introduced into the opening and resin-impregnation apparatus in the manner as discussed above initially passes through the interstice formed between the paired opening pins to the position at which the fiber bundle gradually subjected to the opening passes through the final paired opening pins.

The continuous fiber bundle 2 runs through the interstice formed between two such fixed opening pins 4 without coming in contact with both of these fixed opening pins 4 and moves in the molten resin towards a shape-determining nozzle 6. Thus, the continuous fibers initially in the form of a bundle is gradually subjected to opening during the downward movement of the continuous fiber bundle 2 towards the shape-determining nozzle 6. The opening and resin-impregnation apparatus 1 is filled with a molten resin and the resin penetrates into the opened continuous fibers as the opening of the fiber bundle 2 proceeds.

Regarding the fixed opening pins, each opening pin pair comprises a set of two pins arranged upper and lower positions. In FIG. 1, the paired opening pins 41 with which the continuous fiber bundle initially encounters includes a fixed opening pin 41$u$ positioned above the fiber bundle 2 and a fixed opening pin 41$d$ positioned below the fiber bundle 2. These fixed opening pins 41$u$ and 41$d$ form an interstice therebetween and the interstice is designed in such a manner that the fiber bundle 2 can pass through the same without coming in contact with these pins 41$u$ and 41$d$.

In this respect, these fixed opening pins 41$u$ and 41$d$ arranged so that the length (H: hereinafter also referred to as "definition distance") of the perpendicular line connecting a plane ("upper plane (Pu)") on the surface of the upper fixed opening pin 41$u$ which is nearest to the continuous fiber bundle and approximately parallel to the fiber bundle and a plane ("lower plane (Pd)") on the surface of the lower fixed opening pin 41$d$ which is nearest to the continuous fiber bundle and approximately parallel to the fiber bundle, and an average diameter (D) of single fibers constituting the continuous fiber bundle in general satisfy the relation: $10 \, D \leq H \leq 500 \, D$, preferably $20 \, D \leq H \leq 300 \, D$.

Moreover, when providing a plurality of the paired opening pins as shown in FIG. 1, the definition distances (H)

between the fixed opening pins 42u and 42d and between the fixed opening pins 43u and 43d are set at values so that each definition distance and the average diameter (D) of single fibers constituting the continuous fiber bundle (2) fulfills the following relation: 10 D≦H≦500 D, preferably 20 D≦H≦300 D.

In the opening step of the present invention, the continuous fiber bundle 2 to be subjected to opening is impregnated with a molten resin while passing through a bath filled with the molten resin (a reservoir zone) without coming in contact with the paired opening pins 41 as the means for opening. To this end, it is important that the definition distance (H) of the paired opening pins 41 is sufficiently larger than the average diameter (D) of the single fibers formed by the opening. If the foregoing requirement is not satisfied, it can become considerably difficult that the continuous fiber bundle (2) passes through the interstice formed between the opening pins constituting the paired opening pins 41 without coming in contact with these opening pins.

If the continuous fiber bundles are glass rovings each having a bundling number of 4000 and the diameter (D) of the single fiber constituting the fiber bundle is assumed to be, for instance, about 17 μm, the definition distance (H) in general falls within the range: 170 μm≦H≦8500 μm and preferably 340 μm≦H≦5100 μm. There have of course been proposed a variety of continuous fiber bundle products having bundling numbers and average diameters of single fibers, at least either of which is different from those specified above and there have rather been known many products having an average diameter (D) of single fiber ranging from 9 to 23 μm and a bundling number ranging from 1000 to 4000.

The continuous fiber bundle 2 is subjected to opening by passing through the opening pin pair at least one time without coming in contact with the fixed opening pins.

FIG. 1 shows an embodiment wherein three pairs of opening pins 41 are arranged, starting from the upstream side, along the moving direction of the continuous fiber bundle 2. In such apparatus 1, the continuous fiber bundle 2 is gradually subjected to opening by passing through the interstices between these three paired opening pins 3 without coming in contact with the fixed opening pins 41u, 41d, 42u, 42d, 43u, 43d. In this respect, the continuous fiber bundle 2 is impregnated with a molten resin charged in the apparatus 1 while the fiber bundle gradually passes through the opening stage and thus, a continuous fiber-reinforced resin structure 7 according to the present invention is formed.

In the opening and resin-impregnation apparatus 1 as is shown in FIG. 1, the paired opening pins 41 preferably comprises the upper opening pin 41u and the lower opening pin 41d which are arranged in such a manner that they sandwich the continuous fiber bundle 2 from the upper and lower sides thereof and that they are free of any rotation and also preferably, at least three such pairs are systematically provided towards the downstream direction.

Furthermore, at least five such paired opening pins are preferably provided in order to improve the degree of opening and the ability of the opened continuous fiber to be impregnated with the resin.

The minimum distance between each neighboring paired opening pins in the foregoing production apparatus is not particularly restricted, but the minimum distance (for instance, the minimum distance between the paired opening pins comprising fixed opening pin 41u and 41d and the paired opening pins comprising fixed opening pin 42u and 42d) is in general set at a level of not less than 15 mm, preferably not less than 25 mm when taking a case wherein each of the opening pins is a rod having a circular section and a diameter of 10 mm by way of example.

There has conventionally been adopted a method in which a continuous fiber bundle 2 is brought into contact with opening pins 4 when the fiber bundle 2 (roving) is subjected to opening. In the present invention, however, the continuous fiber bundle 2 is opened while passing it in a molten resin-storing zone through the interstices formed between the paired opening pins 4u and 4d which are free of any rotation without coming in contact with the surface of the opening pins at all. The resin penetrates into the spaces formed between the opened continuous fibers along with the opening of the continuous fiber.

The continuous fiber bundle 2 is sufficiently subjected to opening although the fiber bundle 2 and the opened continuous fibers only run near the fixed opening pins 4 without coming in contact with the same. This fact contradicts conventional wisdom. Although the opening mechanism has not yet been elucidated, it is recognized that the molten resin rises on the upstream side of the fixed opening pins 4 of a pair during the passage of the continuous fiber bundle 2 through the opening and resin-impregnation apparatus 1.

It would be supposed, from this fact, that the movement of the fiber bundle 2 is accompanied by a flow of the molten resin near the surface thereof along the moving direction of the bundle. Simultaneously, the resin flow thus generated collides with the upstream side walls of the paired upper and lower fixed opening pins 4u and 4d, thus causes a change in the flowing direction and goes away from the fiber bundle to generate a vortex flow in which the horizontal axis serves as the center thereof.

If taking the fixed opening pin 4u as an example, the resin flow generates a counterclockwise vortex flow directed upward and comes back to the upstream side and then descends and almost perpendicularly collides with the continuous fiber bundle 2, while the behavior of the resin flow near the lower fixed opening pin 4u is contrary to that near the upper opening pin. More specifically, the resin flow which collides with the lower fixed opening pin 4u generates a clockwise vortex flow, comes back to the upstream side, then ascends and approximately upwardly collides with the continuous fiber bundle 2. Thus, it would be interpreted that the latter resin flow serves to open the fiber bundle 2 together with the resin flow which downwardly collides with the bundle.

Incidentally, even in the multiple opening and resin-impregnation apparatus in which at least three pairs of fixed opening pins 4 (each pair comprises a combination of upper and lower pins) as will be detailed below, it would be considered that the same vortex flows described above may be generated near each paired opening pins and the opening of the continuous fiber bundle is thus carried out by the action of the vortex flows.

More specifically, the following requirements can be fulfilled in the method of the present invention:

The continuous fiber bundle passes through the interstice formed between the opening pins without coming in contact with the pins during the opening stage;

The ratio of the vertical distance (or definition distance), i.e., the distance between the pins making a pair to the average diameter of the continuous fiber may be set at a specific range; and The continuous fiber bundle can approximately linearly run during the opening without any change in the moving direction.

As has been described above, in the present invention the non-contact opening and impregnation unexpectedly permit the achievement of high impregnating ability and high productibity even in high speed opening and high speed taking-off which have never been considered to be realized easily as a result of various drawbacks such as fluffing.

Figure 2:
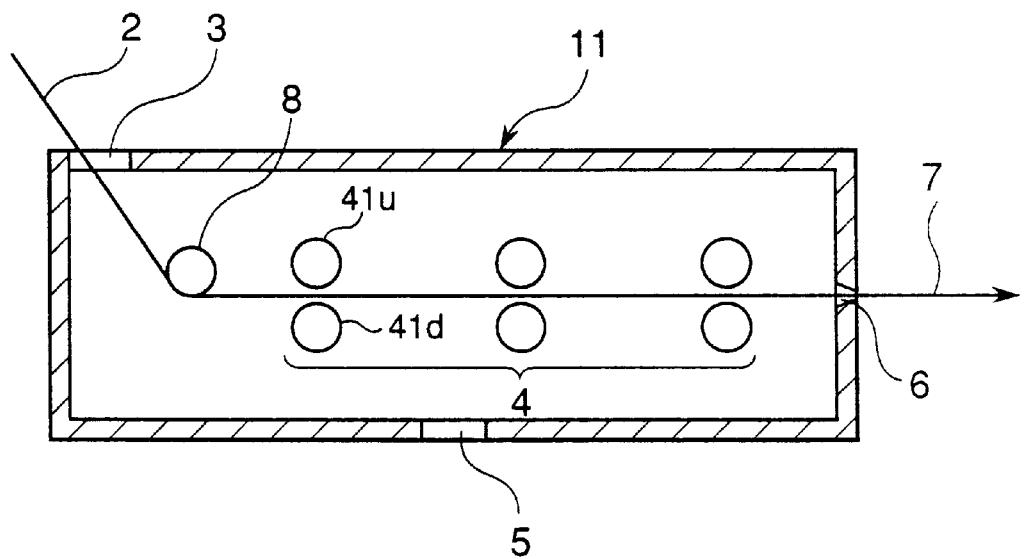
FIG. 2 is a schematic vertical cross sectional view of an embodiment of an apparatus, according to a second aspect of the present invention, for producing a resin-impregnated structure reinforced by continuous fibers, which is reinforced with uni-directionally arranged continuous fibers and produced by the method of the present invention and, wherein continuous fiber rovings are introduced into the apparatus at upper portion of the apparatus on the upstream side.

As has been discussed above in detail, the continuous fiber-reinforced resin structure and the columnar product according to the present invention can be produced using the first opening and resin-impregnation apparatus, shown in FIG. 1, according to the present invention, but the continuous fiber-reinforced resin structure may likewise be produced using the second opening and resin-impregnation apparatus 11, shown in FIG. 2, according to the present invention.

In FIG. 2, the reference numeral 11 represents this second opening and resin-impregnation apparatus and this apparatus is provided with an opening 3 for introducing a continuous fiber bundle 2 into the second apparatus 11 on an upstream top plate in the moving direction of the fiber bundle 2.

The moving direction of the continuous fiber bundle 2 introduced into the second opening and resin-impregnation apparatus 11 through the continuous fiber bundle-introducing opening 3 is changed by a turning pin 8 so that the fiber bundle 2 passes through the interstice formed between the upper and lower opening pins 41u and 41d without coming in contact with these fixed opening pins 4 and is taken out through the shape-determining nozzle 6 in the form of a continuous fiber-reinforced resin structure 7.

In FIG. 2, the position of each paired opening pins and the arrangement of the common members are the same as those depicted on FIG. 1 and all the members which are common to those shown in FIG. 1 bear the same reference numerals.

Figure 3:
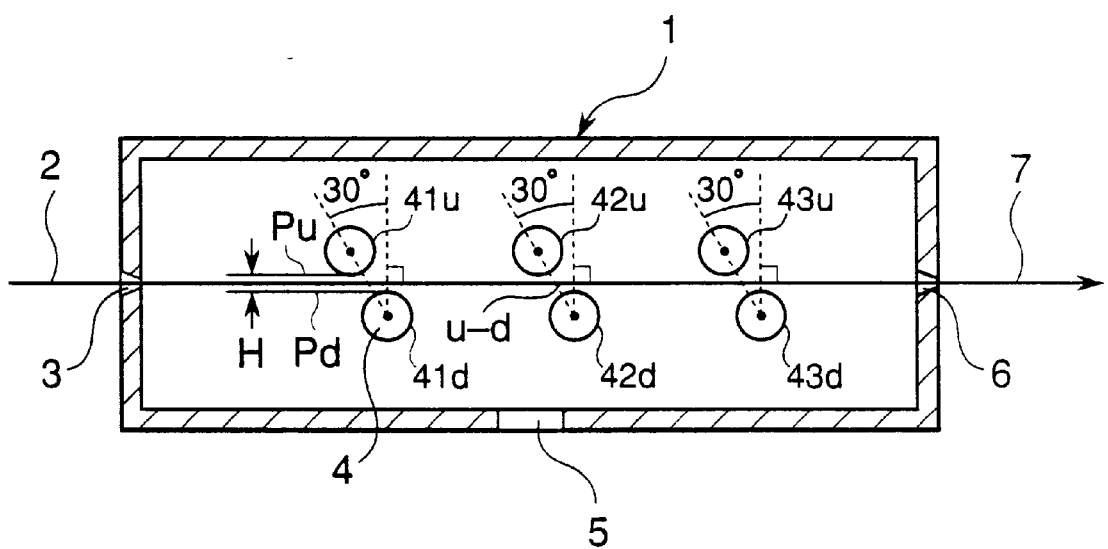
FIG. 3 shows an apparatus, according to a third aspect of the present invention, for producing a resin-impregnated structure reinforced by continuous fibers, which is reinforced with uni-directionally arranged continuous fibers and produced by the method of the present invention and is, more specifically, a schematic vertical cross sectional view of an apparatus according to an embodiment wherein a continuous fiber roving is introduced into the apparatus through an opening for introducing a continuous fiber bundle positioned on the end wall on the upstream side of the apparatus and the upper opening pins are parallelly shifted (set aside to one side) towards the upstream side relative to the lower opening pins.

Moreover, in the opening and resin-impregnation apparatus 11 of the present invention, the paired fixed opening pins 4 are not necessarily perpendicularly arranged, as shown in FIG. 3.

As has been shown in FIG. 3, for instance, the paired fixed opening pins may likewise sandwich the continuous fiber bundle 2 in such a manner that the upper fixed opening pin 41u constituting the opening pin pair 41 sandwiching from the upper and lower directions, the fiber bundle 2 which moves in the horizontal direction, while maintaining its approximately horizontal condition, comes in contact with the fiber bundle 2 from the downward direction at a position inclined to the upstream side, while the lower fixed opening pin 41d comes in contact with the fiber bundle 2 from the upward direction at a position inclined to the downstream side.

In the same manner, the upper fixed opening pins 42u and 43u as well as the lower fixed opening pins 42d and 43d are arranged. In the present invention, such a sandwiched state of the fiber bundle 2 is also referred to as "oblique sandwiching".

Thus, when two fixed opening pins 4u and 4d are arranged such that the fiber bundle 2 is obliquely sandwiched in this way, the upper and lower fixed opening pins 41u and 41d, as shown in FIG. 3, are arranged so that the plane perpendicular to that on which the fiber bundle 2 moves intersects the plane u-d including both the central axes of the fixed opening pins 41u and 41d at an angle which satisfies the following relation: usually $-45°\leq\alpha\leq+45°$ and preferably $-35°\leq\alpha\leq+35°$.

Therefore, as an embodiment wherein the fixed opening pin 4 is arranged so as to obliquely sandwich the continuous fiber bundle 2, by contrast to the embodiment shown in FIG. 3, the lower fixed opening pin 41d is positioned on the upstream side of the molten resin flow generated by the movement of the fiber bundle 2, while the upper fixed opening pin 41u is positioned on the downstream side of the molten resin flow generated by the movement of the fiber bundle 2. In this case, other fixed opening pins 42d, 43d as well as the fixed opening pins 42u, 43u are usually arranged in the same manner.

Moreover, in an extended embodiment, every fixed opening pins 4 may be arranged such that the upper fixed opening pin 41u and the lower fixed opening pin 41d in one paired opening pins 41 sandwich the fiber bundle 2 from the upstream and downstream sides thereof respectively, that the upper and lower fixed opening pins 42u, 42d in another paired opening pins 42 sandwich the fiber bundle 2 from the downstream and upstream sides thereof respectively and that the upper and lower fixed opening pins 43u, 43d in the third paired opening pins 43 sandwich the fiber bundle 2 from the directions just above and just below the bundle 2 respectively. In FIGS. 2 and 3, all the members which are common to those depicted on FIG. 1 bear the same reference numerals.

As has been described above, the continuous fiber-reinforced resin structure 7 of the present invention can be produced using, for instance, the opening and resin-impregnation apparatus shown in FIGS. 1 to 3, but a multiple opening and resin-impregnation apparatus as will be detailed below may be used in the production method of the continuous fiber-reinforced resin structure 7 of the present invention.

The multiple opening and resin-impregnation apparatus used in the method of the present invention comprises at least:

a zone through which a molten resin formed in a molten resin-supply system flows, said molten resin haing supplied to the zone through a pore for introduction and stored therein in a predetermined amount;

at least two openings for introducing continuous fiber bundles, which is positioned on an end wall or a top plate arranged on the upstream side of the zone for immersion;

at least three (three pairs of) fixed opening pins 4, said pins being approximately perpendicularly positioned within the zone so that the continuous fiber bundles 2 introduced therein are immersed in the molten resin and pass therethrough without coming in contact with the pins;

a shape-determining nozzle 6 positioned on the downstream side along the moving direction of the continuous fiber bundles 2 for drawing the fiber bundles 2 introduced from the openings 3 for introduction to out of the zone while passing the bundles through the interstices formed between the opening pins 4 without coming them into contact with the pins 4; and a take-off system for the continuous fiber-reinforced resin structure 7 drawn from the shape-determining nozzle.

Figure 4:
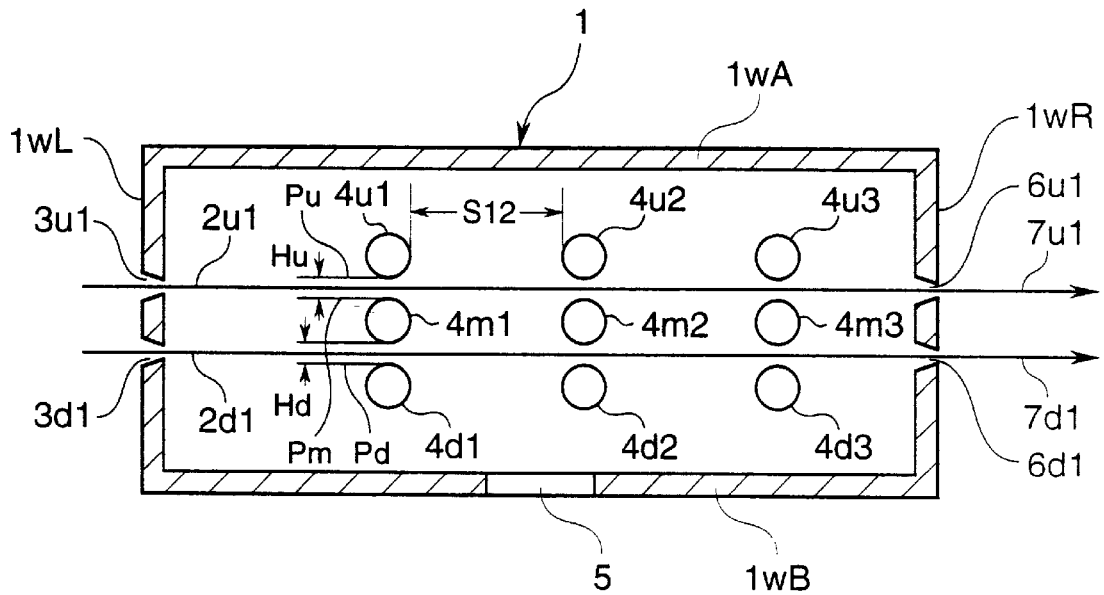
FIG. 4 is a schematic vertical cross sectional view of a basic embodiment of the opening and resin-impregnation apparatus according to the present invention for producing resin-impregnated structures reinforced by continuous fibers, each of which is reinforced with uni-directionally arranged continuous fibers and produced by the method of the present invention.

FIG. 4 is a schematic cross sectional view of an embodiment of the first multiple opening and resin-impregnation apparatus.

A plurality of continuous fiber bundles 2u1 and 2d1 are introduced into the multiple opening and resin-impregnation apparatus 1 (abbreviated as "multiple apparatus 1") according to the present invention as shown in FIG. 4.

In FIG. 4, the upper continuous fiber bundle 2u1 upward positioned is introduced into the multiple opening and resin-impregnation apparatus 1 through an upper continuous fiber bundle-introducing opening 3u1 positioned on the left side wall 1wl of the apparatus 1, while the lower continuous fiber bundle 2d1 downward positioned is introduced into the multiple opening and resin-impregnation apparatus 1 through a lower continuous fiber bundle-introducing opening 3u1 positioned below the upper continuous fiber bundle-introducing opening 3u1 on the left side wall 1wl of the apparatus 1. The continuous fiber bundles 2u1 and 2d1 used in this embodiment may be the same as those used in the opening and resin-impregnation apparatus shown in FIG. 1. In addition, the shapes, structures, materials, sizes or the like of the fixed opening pins 4 are identical to those discussed above in connection with the embodiment shown in FIG. 1.

The multiple opening and resin-impregnation apparatus 1 is filled with a molten resin as has been described above in connection with the embodiment shown in FIG. 1. The molten resin charged therein is obtained in a molten resin-supply system (not shown) and fed to the multiple apparatus 1 through the resin-introducing opening 5.

This multiple opening and resin-impregnation apparatus 1 is provided with a plurality of fixed opening pins 4 which are approximately perpendicularly aligned. More specifically, the multiple opening and resin-impregnation apparatus 1 comprises upper fixed opening pins 4u1, middle opening pins 4m1 and lower fixed opening pins 4d1 which are approximately aligned in vertical lines. In this connection, the upper fixed opening pins 4u1 and the middle opening pins 4m1 are arranged so as to form an interstice through which the upper continuous fiber bundle 2u1 can pass without coming in contact with these pins. The middle fixed opening pin 4m1 and the lower fixed opening pin 4d1 are positioned so as to pass the lower continuous fiber bundle 2d1 can pass without coming in contact with these pins. Regarding the upper continuous fiber bundle 2u1, the upper fixed opening pin 4u1 and the middle opening pin 4m1 make a pair and perform the opening of the upper continuous fiber bundle 2u1.

With respect to the lower continuous fiber bundle 2d1, on the other hand, the middle fixed opening pin 4ml and the lower fixed opening pin 4d1 make a pair and perform the opening of the lower continuous fiber bundle 2d1 which passes through the interstice formed between these two fixed opening pins.

The fixed opening pins 4 fitted to the multiple apparatus 1 of the present invention is in general a tubular or rod-like body (hereinafter comprehensively referred to as "rod-like body") such as an approximately cylindrical (hollow) or columnar (solid) body. The generating lines of these fixed opening pins 4 are in general approximately straight lines. Moreover, the diameter of the fixed opening pin 4 is in general in the range of from about 5 to 50 mm and the length thereof may be, in principle, identical to the lateral inside dimension of the multiple opening and resin-impregnation apparatus 1 of the present invention and may range, for instance, from about 200 to 500 mm, provided that the length of the fixed opening pin 4 is also influenced by the number of rovings arranged in parallel (the number of rovings simultaneously introduced into the apparatus, which are arranged in a horizontal row).

Moreover, the upper fixed opening pin 4u, the middle fixed opening pin 4m and the lower fixed opening pin 4d which make pairs are fixed in such a manner that they do not rotate as the continuous fiber bundles 2u1, 2d1 proceed. The fact that these fixed opening pins 4u, 4m and 4d are non-rotatably fixed to the apparatus is very important to generate a vortex flow of the molten resin at the upstream side.

However, when a more vigorous vortex flow should be generated at the upstream of the paired opening pins comprising the upper fixed opening pin 4u and the middle fixed opening pin 4m and of the paired opening pins comprising the middle fixed opening pin 4m and the lower fixed opening pin 4d, these fixed opening pins 4u, 4m and 4d are rotated at an angular velocity sufficient for generating a vector opposite to that of the progressive vector of the continuous fiber bundles 2u1, 2d1 and such embodiments also fall within the range of the present invention.

In the multiple opening and resin-impregnation apparatus 1 of the present invention, the continuous fiber bundles 2u1 and 2d1 each is introduced into the apparatus from the right hand side (downstream side) thereof through the corresponding continuous fiber bundle-introducing opening 3ul or 3dl positioned on the left side wall 1wL in FIG. 4, the fiber bundles pass through the passage sandwiched by two upper and lower fixed opening pins 4ul and 4ml which make a pair together or the passage sandwiched by fixed opening pins 4ml and 4dl which make a pair together and thus are subjected to opening, without coming in contact with the fixed opening pins 4ul, 4ml and 4dl and the molten resin penetrates into and/or between a number of continuous fibers thus separated. In this connection, if the upper and lower opening pins 4ul and 4dl are both rotatable, the middle fixed opening pin 4ml is in general fixed so as not to cause rotational motion.

In the principal opening stage in the multiple opening and resin-impregnation apparatus 1 of the present invention, the continuous fiber bundles 2ul and 2dl to be subjected to opening pass through the molten resin without coming in contact with any fixed opening pin 4 and are spaced apart a distance, falling within a specific range, from either of the fixed opening pins 4 constituting a paired opening pins. It is preferred that the interstice formed between a pair of opening pins through which the continuous fiber bundle 2ul or 2dl passes falls within a desired range in order that the opening of the fiber bundles are ensured although the continuous fiber bundles 2 do not come in contact with any fixed opening pin 4 as has been described above. The vertical distance (H) between the pins constituting a specific paired opening pins is herein specified as "definition distance (H)". The definition distance (H) and the average diameter (D) of the single fibers constituting the continuous fiber bundle 2 to be subjected to opening preferably satisfy the following relation represented by an inequality.

That is, the following relation: usually $10\ D \leq H \leq 500\ D$, preferably $20\ D \leq H \leq 300\ D$ is established between the definition distance H and the average diameter D of the continuous fiber.

In the multiple opening and resin-impregnation apparatus 1 of the present invention, if selecting three stages of opening pins 4u, 4m and 4d which are arranged approximately in the vertical direction, the upper and middle fixed opening pins 4u and 4m make a pair and the middle and lower fixed opening pins 4m and 4d make a pair. In this case, the definition distance (Hu) of the former pair and that (Hd) of the latter pair may be the same or different. The effect of the present invention, i.e., "the opening and impregnation without causing any fluffing" can often be accomplished certainly in any pair by reducing the distance (H) as the opening of the continuous fiber bundle 2 proceeds.

In FIG. 4, there is shown an embodiment in which three (or three stages) of fixed opening pins 4 are arranged in the vertical direction. The fixed opening pins 4 arranged in the vertical direction may of course be not less than 3 (or 3 stages), preferably 3 to 5.

In FIG. 4, three (odd number) of the fixed opening pins 4 is arranged in the vertical direction and therefore, the middle fixed opening pin 4ml serves not only as a lower fixed opening pin for constituting a pair for the upper continuous fiber bundle 2ul, but also as an upper fixed opening pin for constituting a pair for the lower continuous fiber bundle 2dl, but if even number of fixed opening pins 4 are arranged in the vertical direction, opening pin pairs each may be formed from two specially designed fixed opening pins.

The embodiment shown in FIG. 4 corresponds to a multiple opening and resin-impregnation apparatus 1 in which three fixed opening pins are arranged in the vertical direction and two additional groups of fixed opening pins wherein the pins in each group are arranged along the vertical direction to thus give paired opening pins are provided on the downstream side along the moving direction of the continuous fiber bundle 2. The second group of the fixed opening pins comprise three fixed opening pins represented by 4u2, 4m2 and 4d2 and the third group of the fixed opening pins comprise three fixed opening pins represented by 4u3, 4m3 and 4d3. In these second and third groups of the fixed opening pins, the mounting positions for every fixed opening pins or the like are similar to those described above in connection with the first group of the fixed opening pins. FIG. 4 shows a multiple opening and resin-impregnation apparatus 1 provided with three groups of fixed opening pins, but the apparatus may of course be provided with 1 to 3 groups of fixed opening pins or not less than 4 groups, preferably not less than 5 groups of fixed opening pins.

The continuous fiber bundles 2u1 and 2d1 which have been subjected to opening by passing through the interstices (H) formed between the opening pins arranged in the foregoing manner and simultaneously impregnated with a resin are taken off through two stages, i.e., upper and lower shape-determining nozzles 6ul and 6dl formed on the downstream end wall 1wR of the multiple opening and resin-impregnation apparatus 1 to thus give continuous fiber-reinforced resin structures 7ul and 7dl.

Figure 5:
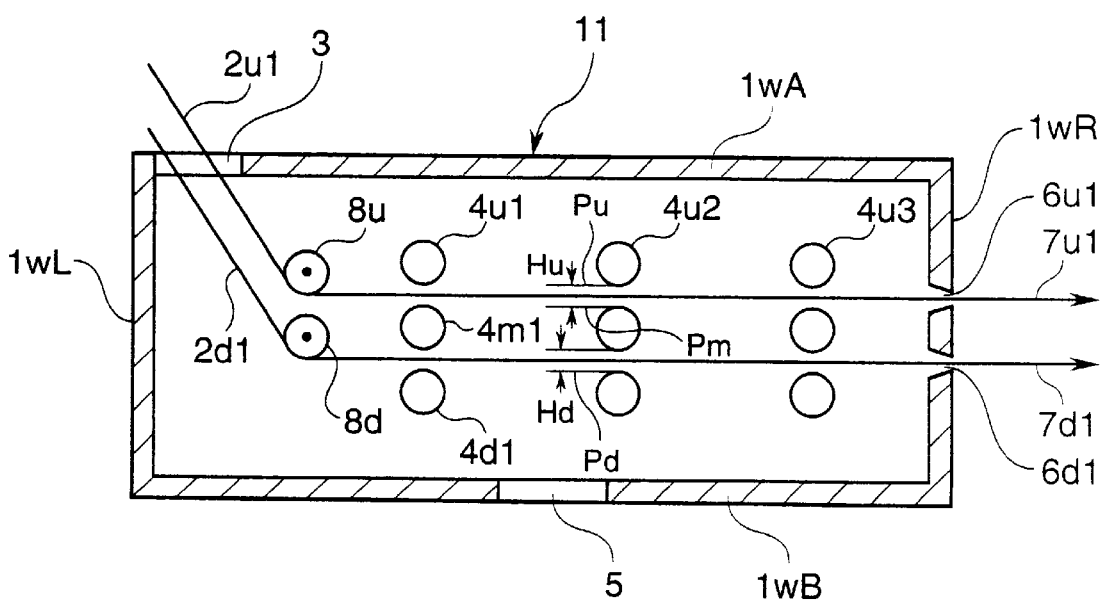
FIG. 5 is a schematic vertical cross sectional view of a modified embodiment 1 of the opening and resin-impregnation apparatus according to the present invention for producing resin-impregnated structures reinforced by continuous fibers, each of which is reinforced with uni-directionally arranged continuous fibers and produced by the method of the present invention.

As seen from FIG. 4, the multiple opening and resin-impregnation apparatus 1 used in the method of the present invention comprises a reservoir part which is composed of an upstream end wall 1wL, a downstream end wall 1wR, right and left side walls thereof (not shown), a bottom plate 1wB and a top plate 1wA; a plurality of continuous fiber bundle-introducing opening 3ul and 3d1 formed on the upstream end wall 1wL; paired opening pins comprising at least three fixed opening pins 4ul, 4ml and 4dl arranged along the vertical direction; and shape-determining nozzles 6ul and 6dl formed on the downstream end wall 1wR for taking off the continuous fiber bundles 2 which is subjected to opening by passing through the paired opening pins and is impregnated with a resin. In the multiple opening and resin-impregnation apparatus 11 of the present invention, the continuous fiber bundle-introducing openings 3 may be formed on the top plate 1wA as shown in FIG. 5. If the continuous fiber bundle-introducing openings 3 are formed on the top plate 1wA, the moving direction of the continuous fiber bundles 2 introduced into the apparatus must be changed before the fiber bundles 2 encounter the initial paired opening pins to a direction in which the bundles do not come in contact with any fixed opening pin in order to take off the opened (filamentated) fiber bundles 2 through the shape-determining nozzles 6 after the opening of the fiber bundle by passing through the interstices formed between the fixed opening pins 4 without bringing into contact with any pin 4.

In FIG. 5, the reference numeral 11 represents this second multiple opening and resin-impregnation apparastus and the apparastus is provided with openings 3 for introducing the continuous fiber bundles 2ul and 2dl into the second multiple opening and resin-impregnation apparastus 11 formed on the top plate 1wA on the upstream side along the moving direction of the fiber bundles 2.

Then the moving direction of the continuous fiber bundles 2ul and 2dl introduced into the second multiple opening and resin-impregnation apparatus 11 through the continuous fiber bundle-introducing opening 3 is changed by turning pins 8u and 8d so that they pass through the interstices formed between the upper and middle fixed opening pins 4ul and 4ml and between the middle and lower fixed opening pins 4ml and 4dl without coming in contact with these pins and is then taken off through the shape-determining nozzles 6ul and 6dl. The number of these turning pins 8 is in general determined depending on the number of the corresponding continuous fiber bundles 2 introduced into the multiple apparatus 11.

Figure 6:
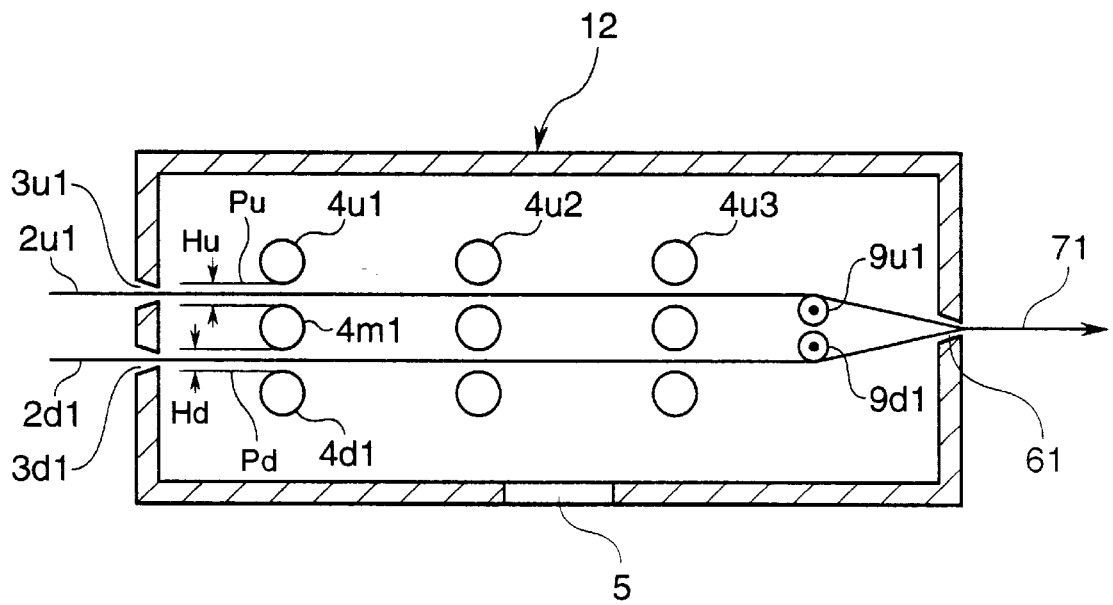
FIG. 6 is a schematic vertical cross sectional view of a modified embodiment 2 of the opening and resin-impregnation apparatus according to the present invention for producing resin-impregnated structures reinforced by continuous fibers, each of which is reinforced with uni-directionally arranged continuous fibers and produced by the method of the present invention.

Moreover, FIG. 6 shows a third multiple opening and resin-impregnation apparatus 12 which is provided with a plurality of continuous fiber bundle-introducing openings 3ul and 3dl formed on the upstream end wall 1wL, wherein the continuous fiber bundles 2ul and 2dl introduced into the apparatus in the same manner explained above in connection with the apparatus shown in FIG. 4 is subjected to opening by passing through the apparatus without coming in contact with any fixed opening pins 4 and simultaneously impregnated with a resin and then a single continuous fiber-reinforced resin structure 71 is taken off in the form of a united single body through a shape-determining nozzle 61.

In case of the third multiple opening and resin-impregnation apparatus 12, it is preferred to fit downsteam turning pins 9ul and 9dl to the apparatus on the downstream side of the final fixed opening pins 4u3, 4m3 and 4d3 so that the continuous fiber bundles 2ul and 2dl can pass through the interstices formed between the paired opening pins comprising fixed opening pins 41, 42 and 43 without coming in contact with any fixed opening pins 4 and then taken off the fiber bundles as a single continuous fiber-reinforced resin structure 71 through the shape-determining nozzle 61.

Further, in the multiple opening and resin-impregnation apparatus or the like of the present invention, the fixed opening pins 4u, 4m and 4d which make a pair do not need to be arranged in the direction perpendicular to the moving direction of the continuous fiber bundles 2.

Figure 7:
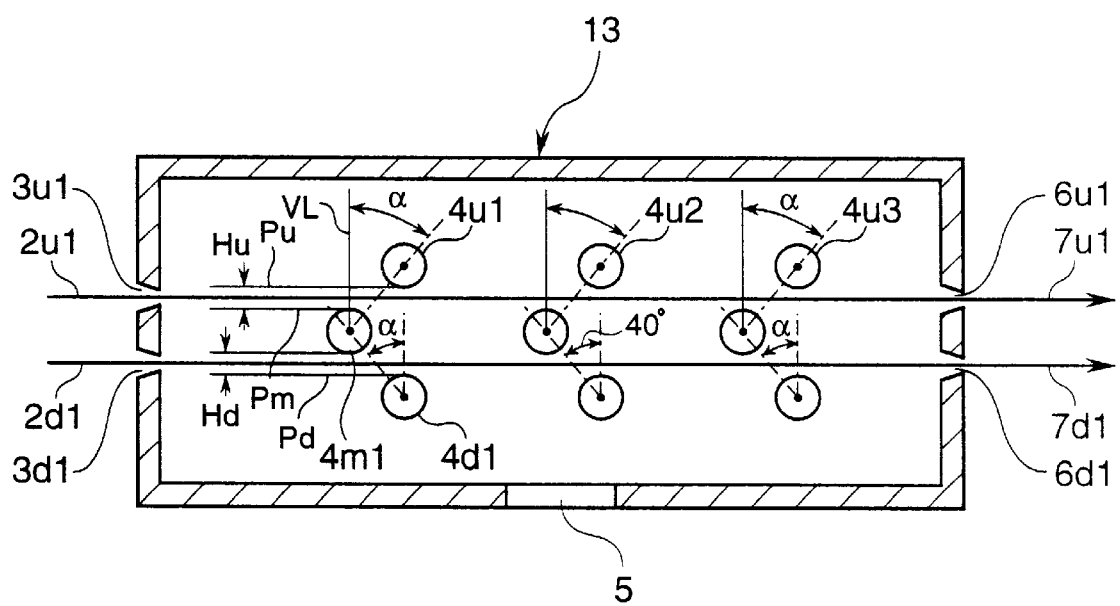
FIG. 7 is a schematic vertical cross sectional view of a modified embodiment 3 of the opening and resin-impregnation apparatus according to the present invention for producing resin-impregnated structures reinforced by continuous fibers, each of which is reinforced with uni-directionally arranged continuous fibers and produced by the method of the present invention.
Figure 8:
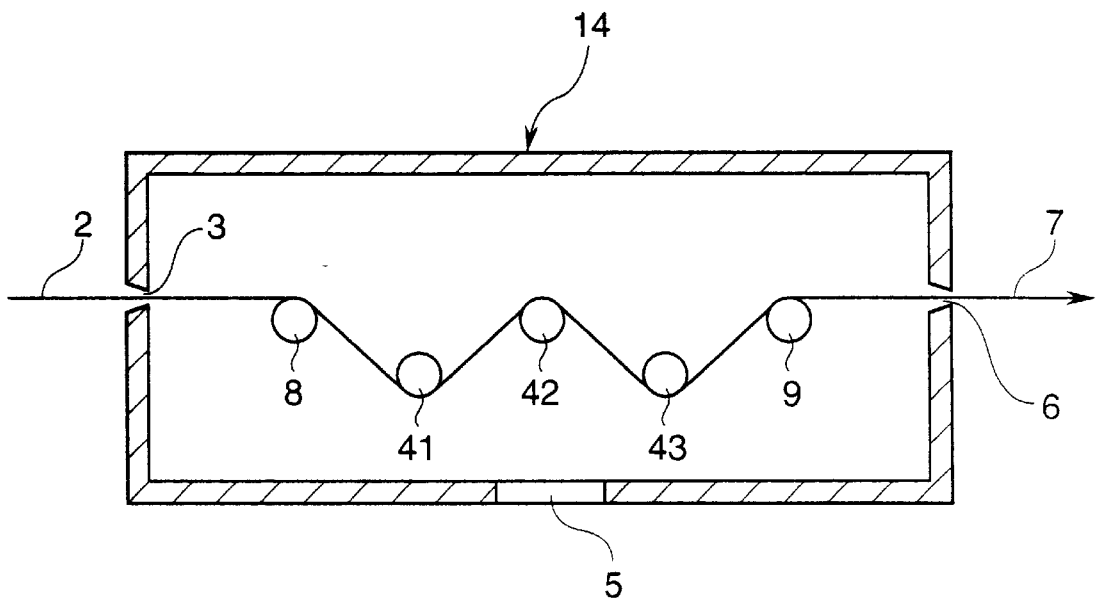
FIG. 8 is a schematic longitudinal sectional view of a conventional opening and resin-impregnation apparatus for producing a resin-impregnated structure reinforced by continuous fibers according to the method of the Comparative Example wherein a continuous fiber roving runs around opening pins which comprise only a single series, in a zigzag pattern.

FIG. 7 shows a fourth multiple opening and resin-impregnation apparatus 13 corresponding to the embodiment wherein the fixed opening pins 4 are arranged at positions which are shifted (deviate) from the positions on a plane perpendicular to the moving direction of the continuous fiber bundles 2.

More specifically, in FIG. 7, in paired opening pins 4, two fixed opening pins 41 makes a pair and these fixed opening pins 4ul, 4ml and 4dl are in general non-rotatably (free of rotational motion) fixed to the side wall of the opening and resin-impregnation apparatus almost perpendicularly thereto. In other words, the mounting positions of these fixed opening pins 4ul, 4ml and 4dl which make the opening pin pairs are selected in such a manner that the central axes of the fixed opening pins 4 are symmetric with respect to the continuous fiber bundles 2ul and 2dl within the plane approximately perpendicular to the plane on which the fiber bundles move.

However, it is sufficient to arrange these paired opening pins in such a manner that the fiber bundles 2ul and 2dl do not come in contact with any fixed opening pins 4 and the opening of the fiber bundles 2ul and 2dl is affected by the flow of the molten resin when the fiber bundles 2ul and 2dl move to downstream side with passing through both the interstices (Hu and Hd) formed between the fixed opening pins 4ul and 4ml and between the fixed opening pins 4ml and 4dl.

In other words, as shown in FIG. 7, the fixed opening pins 4ul, 4ml and 4dl which upwardly or downwardly sandwich the continuous fiber bundles 2ul and 2dl moving along a horizontal direction while keeping an approximately horizontal posture may, for instance, be designed so as to come close to the fiber bundles 2ul and 2dl from the positions slightly shifted to the upstream and downstream directions respectively. More specifically, the fixed opening pins may likewise be arranged in such a manner that the fixed opening pin 4ul comes close to the fiber bundle 2ul from the slightly upstream side, while the fixed opening pin 4ml comes close to the fiber bundle 2ul from the slightly downstream side and the fixed opening pin 4ml comes close to the fiber bundle 2dl from the slightly downstream side, while the fixed opening pin 4dl comes close to the fiber bundle 2dl from the slightly upstream side. In the present invention, such an embodiment for sandwiching the fiber bundle 2 will also be referred to as "multiple oblique sandwiching" below.

Thus, when arranging a plurality of fixed opening pins so that they obliquely sandwich the continuous fiber bundles in this way, the two fixed opening pins 4u which are adjacent to one another along the vertical direction, as shown in FIG. 7, are arranged in such a manner that the plane perpendicular to that on which the fiber bundle 2 moves intersects the plane including both the central axes of these fixed opening pins at an angle "α" which satisfies the following relation: usually $-45° \leq \alpha \leq +45°$ and preferably $-35° \leq \alpha \leq +35°$.

Therefore, as an embodiment wherein the fixed opening pin is arranged so as to realize such multiple oblique sandwiching of the continuous fiber bundle, the lower fixed opening pin may be positioned at the position contrast to that of the embodiment shown in FIG. 7. Incidentally, the foregoing has been described on the basis of the mounting positions of the fixed opening pins represented by the reference numerals 4ul, 4ml and 4dl. In case where the continuous fiber bundle is subjected to the multiple oblique sandwiching, other fixed opening pins are also arranged in the same manner described above.

Incidentally, in FIGS. 5 to 7, all the members which are identical to those depicted on FIG. 4 bear the same reference numerals.

The columnar products can be produced by, preferably after cooling the continuous fiber-reinforced resin structure taken off through the shape-determining nozzle positioned on the downstream side of the foregoing opening and resin-impregnation apparatus or the multiple opening and resin-impregnation apparatus, cutting the resin-impregnated structure into pieces having a desired length using a means for cutting the structure (not shown) arranged in the vicinity of the shape-determining nozzle. The columnar product in general has an average length ranging from 3 to 50 mm, preferably 5 to 25 mm. The columnar product having such a length may be suitable for most applications. The cutting means is not restricted to the foregoing specific one. Usually, the continuous fiber-reinforced resin structure taken off from the opening and resin-impregnation apparatus is cooled with water and then cut into pieces using a strand cutter to give the columnar products.

Continuous Fiber-Reinforced Resin Structure:

The continuous fiber impregnated with a molten resin within the opening and resin-impregnation apparatus can be taken off from the apparatus through an appropriately selected shape-determining nozzle and, if necessary, runs through another shape-determining nozzle or a shape-determining rolls to thus impart a variety of shapes to the continuous fiber-reinforced resin structure.

The continuous fiber-reinforced resin structure may be, for instance, a variety of materials having various shapes such as rod-like shapes (which may sometimes be referred to as strand or rod), e.g., rods having circular or square cross sections; tape-like bodies; sheet-like bodies; plate materials; and other various shaped sections. These continuous fiber-reinforced resin structures may be used as such or used in a variety of applications after forming into a desired shape by reheating. Moreover, the columnar products obtained by cutting a rod having a circular section and a diameter of about 1 to 3 mm can be used as a material for injection molding or extrusion molding.

Effects of the Invention

When the continuous fiber-reinforced resin structure (the structure is, for instance, a "sheet" and a "rod") of the invention is made by using the opening and rein-impregnation apparatus according to the present invention, various kinds of effects as listed below can be obtained.

(1) The fibers are not impaired (damaged) at all even when the take-off speed of the continuous fiber-reinforced resin structure is increased to 20 to 30 m/min. Therefore, the present invention permits continuous stable production of the resin structure over a long period of time without being accompanied by any fluffing.

(2) Surprisingly, an excellent ability of impregnation can be achieved although the continuous fiber (bundle) does not come in contact with the fixed opening pin. Accordingly, the foregoing continuous fiber-reinforced resin structure shows excellent mechanical strength.

(3) In addition, the fixed opening pins are substantially free from any damage and wear due to the opening of the continuous fiber bundle.

(4) When continuous fiber rovings are used, the present invention permits easy continuous production of resin structures over a long period of time, the production of which cannot be attained by the use of a single roving. This is because, the present invention permits complete elimination of the possibility of detachment of the the entangled rovings at the joined portions and the apparatus can continuously be operated while adding rovings one after another.

(5) Moreover, if adopting the method which makes use of the multiple opening and resin-impregnation apparatus of the present invention, a plurality of continuous fiber bundle can simultaneously be processed without causing any problem due to the interference between rovings and thus the continuous fiber-reinforced resin structure can be produced in high efficiency.

(6) Moreover, if the continuous fiber-reinforced resin structure thus produced is cut into pieces having a desired length, columnar products in which continuous fibers having a length approximately identical to that of the columnar products are unidirectionally arranged therein.

(7) The opening and resin-impregnation apparatus and the multiple opening and resin-impregnation apparatus according to the present invention have very high usefulness in the production of the continuous fiber-reinforced resin structure and the columnar products such as those described above.

EXAMPLES

The present invention will hereinafter be described while illustrating, by way of example, the production of a unidirectionally reinforced resin structure which is reinforced with continuous fibers using the opening and resin-impregnation apparatus (1) of the present invention.

(1) Resin Impregnating Ability

The resulting unidirectionally reinforced resin structure in the form of a strand, rod or the like is cut into pieces having a length of about 100 mm, followed by immersing one end (10 mm) thereof in a solution of Methyl Red in propanol (a solution obtained by adding 1 ml of hydrochloric acid to 50 ml of a saturated propanol solution of Methyl Red as a color-developing indicator to adjust the pH of the solution and to thus improve the color developing ability thereof) for 30 minutes, determining the raised liquid surface level of the color-developing indicator solution. Thus, the sample having a low level of the liquid surface is defined as excellent in the resin-impregnation ability. Each value determined is an arithmetic mean of 10 independent measurements observed for 10 samples. The details of the evaluation will be listed in Table 1.

The evaluation criteria for the determination and evaluation listed in the following Tables 1 and 2 are as follows:

|       |                                                  | Evaluation          |
|-------|--------------------------------------------------|---------------------|
| (1.1) | Height of Liquid Surface (mm)                    | Evaluation          |
|       | less than 20                                     | Excellent           |
|       | not less than 20 and less than 40                | Good                |
|       | not less than 40 and less than 60                | Not Good            |
|       | not less than 60 and less than 80                | Bad                 |
|       | not less than 80                                 | Unacceptable        |
| (1.2) | Flexural Strength (MPa)                          | According to JIS K-7203 |
| (1.3) | Stable Productivity                              |                     |
|       | (This is evaluated on the basis of the number    |                     |
|       | of occurrence of fluffing after passing          |                     |
|       | through a shape-determining nozzle)              |                     |
|       | not observed                                     | Excellent           |
|       | not less than 1 and less than 5                  | Good                |
|       | not less than 5 and less than 10                 | Not Good            |
|       | not less than 11                                 | Bad                 |
|       | occurrence of interruption                       | Unacceptable        |
| (1.4) | Views Concerning Passage of Connected Portion    |                     |
|       | (in particular, the behavior of the connected    |                     |
|       | portions upon passage through the interstice     |                     |
|       | between fixed opening pins)                      |                     |
|       | Passage Without Any Trouble                      | Favorable Condition |
|       | Interruption due to Detachment                   | Detachment          |

(The term "connected portion" used herein means the entangled end portions of glass fiber rovings in which at least two fibers are added to one another).

Example 1

Five glass fiber rovings (2) [averaged single fiber diameter: 17 μm; tex: 2310 g/km; number of bundling: 4000] were arranged in parallel relation, were fed to the opening and resin-impregnation apparatus (1) shown in FIG. 1 through a slit-like fiber-supply opening (3), ran through the apparatus and were continuously taken off at the downstream side. At the same time, a melt of a modified polypropylene [melting point of crystal (Tm; as determined by DSC method): 160° C.; MFR (21.2N; 230° C.): 130 g/10 min; modified with maleic anhydride] was introduced into the apparatus (1) through an extruder (not shown) and the filamentated continuous fibers (2F) were sufficiently impregnated with the molten resin.

In each of three pairs of fixed opening pins (41u and 41d), (42u and 42d) and (43u and 43d), all of the definition distances (clearance) (H41, H42 and H43) between the upper and lower fixed opening pins (4u) and (4d) were set at 1 mm (=60D). The temperature in the opening and resin-impregnation apparatus (1) was adjusted to 270° C. and a resin-impregnated structure (7) which was unidirectionally reinforced with glass continuous fibers was taken off at a velocity of 30 m/min in the form of a rod.

The apparatus was operated at a rate of about 2.5 hours per roll of the roving over about 10 hours, while the final portion of the glass fiber roving (2) is connected, through entangling, to initial part of the subsequent roving at the stage immediately before the complete consumption of one roll thereof. As a result, it was observed that any fluffing of the roving was not generated at all during the operation and the connected portions between the rovings favorably passed through the apparatus The glass fiber roving (2) introduced into the opening and resin-impregnation apparatus (1) was taken off through the shape-determining nozzle (6: inner diameter 4 mm) which was an outlet positioned on the downstream end wall (1wR) of the apparatus (1), in the form of a continuous fiber-reinforced resin rod (7) which was shaped into an approximately circular cross section.

The glass fiber content of the rod (7) was found to be 61% by weight, the resin-impregnation ability was judged to be "excellent" and the rod had a flexural strength of 398 MPa. The stable productivity thereof was evaluated to be "excellent" and the views concerning the passage of the connected portion was also judged to be "favorable condition". These results are summarized in the following Table 1.

Example 2

A continuous fiber-reinforced resin rod (7) was prepared according to the same procedures and conditions used in Example 1 except that an apparatus shown in FIG. 2 as the opening and resin-impregnation apparatus (11) was used and various properties thereof determined were evaluated. The foregoing apparatus (11) was operated as follows: A glass continuous fiber roving (2) was introduced into the apparatus (11) from the upper upstream side, followed by allowing the roving to run around the turning pin (8) positioned at the most upstream side of the apparatus (11) to thus direct the roving to approximately horizontal direction. Then, the roving passed through three pairs of fixed opening pins (41u and 41d; 42u and 42d; 43u and 43d) without coming in contact with these pins to subject the roving to opening and impregnation, and was taken off as a continuous fiber-reinforced resin rod (7) through a shape-determining nozzle (6)(inner diameter 4 mm) positioned at the outlet of the apparatus (1). In this Example, all of the definition distances (H41, H42 and H43) between the upper fixed opening pin (4u) and the lower fixed opening pin (4d) which made a pair were set at a level of 1 mm (=60D).

The glass fiber content of the resulting rod (7) was found to be 61% by weight, the resin-impregnation ability thereof was judged to be "excellent" and the rod had a flexural strength of 404 MPa. The stable productivity thereof was evaluated to be "excellent" and the views concerning the passage of the connected portion of the roving (7) was also judged to be "favorable condition". These results are summarized in Table 1.

There was not observed any fluffing of the glass fiber roving (2) during the operation of the apparatus and the connected portion of the roving (2) identical to that used in Example 1 could pass, without any trouble even within the regions in and around the fixed opening pins (4) and the shape-determining nozzle (6).

Example 3

An apparatus used in this Example was that shown in FIG. 3 as the opening and resin-impregnation apparatus (12). The apparatus (12) shown in FIG. 3 was similar to the opening and resin-impregnation apparatus (1) shown in FIG. 1, provided that three upper fixed opening pins (41u, 42u and 43u) of the three pairs of the fixed opening pins (41u and 41d; 42u and 42d; 43u and 43d) were parallelly shifted towards the glass fiber roving (2)-supply side (upstream side) so that a straight line (sometimes referred to as "straight line u-d") connecting the central axes of the both upper and lower fixed opening pins (41u) and (41d), which made a pair, intersects the normal of the glass fiber roving (2) at an angle (intersectional angle) of 30° (towards left hand side) (inclined towards the upstream side), while the intersectional angles for the other paired pins, i.e., 42u and 42d as well as 43u and 43d were also set at 30° (towards left hand side) and further the definition distances (H41, H42 and H43) between the upper and lower fixed opening pins (4u) and (4d) which made every corresponding pairs each was set at 1 mm (=60D).

A continuous fiber-reinforced resin rod (7) was prepared according to the same procedures and conditions used in Example 1 except that the opening and resin-impregnation apparatus (12) as shown in FIG. 3 was used and various properties thereof determined were evaluated.

The glass fiber content of the resulting rod (7) was found to be 61% by weight, the stable productivity and the resin-impregnation ability thereof were both judged to be "excellent" and the rod had a flexural strength of 392 MPa. The views concerning the passage of the connected portion of the roving (7) was also judged to be "favorable condition". These results are summarized in Table 1.

There was not observed any fluffing of the glass fiber roving (2) during the operation of the apparatus even within the regions in and around the fixed opening pins (4) and the shape-determining nozzle (6).

Example 4

In the opening and resin-impregnation apparatus (13) used in this Example, all of the definition distances (H41, H42 and H43) between the upper and lower fixed opening pins (4u) and (4d) which made every corresponding pairs, i.e., the three pairs of the fixed opening pins (41u and 41d; 42u and 42d; 43u and 43d) fitted to the opening and resin-impregnation apparatus (1) as shown in FIG. 1 were set at a value of 0.43 mm (=25D). A continuous fiber-reinforced resin rod (7) was prepared according to the same procedures and conditions used in Example 1 except that the opening and resin-impregnation apparatus (13) was used and various properties thereof determined were evaluated.

The glass fiber content of the resulting rod (7) was found to be 61% by weight, the stable productivity and resin-impregnation ability thereof were both judged to be "excellent" and the rod had a flexural strength of 410 MPa. The view concerning the passage of the connected portion of the roving (7) was also judged to be "favorable condition". These results are summarized in Table 1.

There was not observed any fluffing of the glass fiber roving (2) during the operation of the foregoing apparatus (13) even within the region in and around the fixed opening pins (4) and the shape-determining nozzle (6).

Example 5

A continuous fiber-reinforced resin rod (7) was prepared according to the same procedures and conditions used in Example 1 except that, in the opening and resin-impregnation apparatus (14) used in this Example, all of the definition distances (H41, H42 and H43) between the upper and lower fixed opening pins (4u) and (4d) which made every corresponding pairs, i.e., the three pairs of the fixed opening pins (41u and 41d; 42u and 42d; 43u and 43d) fitted to the opening and resin-impregnation apparatus (1) as shown in FIG. 1 were set at a value of 43 mm (=250D).

The glass fiber content of the resulting rod (7) was found to be 61% by weight, the stable productivity and resin-impregnation ability thereof were both judged to be "excellent" and the rod had a flexural strength of 388 MPa. The view concerning the passage of the connected portion of the roving (7) was also judged to be "favorable condition". These results are summarized in Table 1.

There was not observed any fluffing of the glass fiber roving (2) during the operation of the foregoing apparatus (14) even within the region in and around the fixed opening pins (4) and the shape-determining nozzle (6).

Example 6

A continuous fiber-reinforced resin rod (7) was produced using the same procedures and conditions described in Example 1 except that, in the opening and resin-impregnation apparatus (15) used in this Example, all of the definition distances (H41, H42 and H43) between the upper and lower fixed opening pins (4u) and (4d) in the three pairs of fixed opening pins (41u and 41d; 42u and 42d; 43u and 43d) fitted to the opening and resin-impregnation apparatus (1) shown in FIG. 1 were adjusted to 6.8 mm (=400D) and that the take-off speed was raised up to 35 m/min.

The glass content of the rod (7) was found to be 61% by weight, the stable productivity thereof was judged to be "excellent", the resin-impregnation ability thereof was judged to be "good" and the flexural strength thereof was found to be 379 MPa. The view concerning the passage of the connected portion thereof was judged as "favorable condition". These results obtained are listed in the following Table 1.

There was not observed any fluffing of the roving (2) during the operation of the foregoing apparatus (15) even within the region in and around the fixed opening pins (4) and the shape-determining nozzle (6).

Example 7

A continuous fiber-reinforced resin rod (7) was prepared according to the same procedures and conditions used in Example 1 using the opening and resin-impregnation apparatus (1) shown in FIG. 1, except that the temperature in the apparatus (1) was changed to 240° C. and that all of the definition distances (H4) between the fixed opening pins which made every corresponding pairs (4ud) were respectively set at 1.7 mm (=100D). The various properties of the rod (7) were determined and evaluated.

The glass fiber content of the resulting rod (7) was found to be 61% by weight, the resin-impregnation ability and stable productivity thereof were both judged to be "excellent" and the rod had a flexural strength of 390 MPa. The view concerning the passage of the connected portion of the roving (7) was also judged as "favorable condition". These results are summarized in Table 1.

Example 8

A continuous fiber-reinforced resin rod (7) was prepared according to the same procedures and conditions used in Example 1 using the opening and resin-impregnation apparatus (1) shown in FIG. 1, except for using, as the thermoplastic resin, 6,6-polyamide resin [relative viscosity: 2.50 (using a 98% sulfuric acid solution as defined in JIS K6810); trade name: Nylon 2015B; available from Ube Industries, Ltd.].

The glass fiber content of the resulting rod (7) was found to be 56% by weight, the resin-impregnation ability was judged to be "excellent" and the stable productivity thereof was judged to be "good" and the rod had a flexural strength of 477 MPa. The view concerning the passage of the connected portion of the roving (7) was also judged as "favorable condition". These results are summarized in Table 1.

Example 9

The same procedures used in Example 1 were repeated according to the same rocedures and conditions used in Example 1 using the opening and resin-impregnation apparatus (1) shown in FIG. 1, except that a maleic anhydride-modified polypropylene [(MAH-PP) MFR (21.2N; 230° C.) 130 g/10 min] as the thermoplastic resin was supplied to the apparatus (1) in its molten state, that there was used a continuous fiber bundle-introducing opening (3) which permitted the simultaneous introduction of 5 glass fiber rovings (2) arranged in parallel to thus introduce 5 continuous fiber bundles (2) arranged in parallel, that 5 nozzles having a circular cross section (inner diameter 2.4 mm) were arranged in an almost parallel relation, that all of the definition distances (H41, H42, H43 and H44) between the fixed opening pins which made four pairs of fixed opening pins (4ud) were adjusted to 1.4 mm (=85D) and that the temperature was changed to 260° C.

All of the glass fiber contents of the resulting 5 continuous fiber-reinforced resin strands (7) were found to be 40% by weight, the resin-impregnation ability and the stable productivity thereof were both judged to be "excellent" and the view concerning the passage of the connected portion was judged as "favorable condition". The reinforced strand (7) was cut (or pelletized) into pieces having a length of 10 mm and then used in injection-molding to give a test piece. The test piece (4 mm thick×10 mm long×100 mm wide) was found to have a flexural strength of 201 MPa. These results are summarized in Table 1.

Example 10

A structure (7) reinforced with substantially unidirectionally arranged sheet-like glass continuous fibers was prepared according to the same procedures and conditions used in Example 1, except that the dimension of the rectangular nozzle for shaping was changed to 0.24 mm long×60 mm wide.

The stable productivity thereof was judged to be "excellent" since there was not observed any fluffing throughout the operation of the opening and rein-impregnation apparatus (1). Moreover, the connected portion between the end portion of the preceeding glass roving (7) and the initial portion of the subsequent glass roving (7) satisfactorily passed through the foregoing apparatus (1). The glass content of the resulting reinforced sheet was found to be 60% by weight. The reinforced sheet (7) was cut along the direction of the reinforcing fiber included therein at an arbitrary position to give a strip (100 mm long×10 mm wide), then the resin-impregnation ability thereof was determined by repeating the same procedures used in Example 1 and it was judged to be "excellent".

Similarly, the reinforced sheet (7) was cut along the direction of the reinforcing fiber included therein at another arbitrary position to give a strip (10 mm long×10 mm wide).

Twelve of these sheets were put in layers while arranging the reinforcing fibers included therein in one direction, followed by pressing with heating at a temperature of 200° C. and a pressure of 0.2 MPa to give a reinforced laminate. The flexural strength of the laminate was determined using it as a specimen (100 mm long×10 mm width×2.8 mm thick) and was found to be 608 MPa.

Comparative Example 1

The same procedures used in Example 1 were repeated under the same conditions described in Example 1 to try to prepare a continuous fiber-reinforced resin rod (7) and to determine the properties thereof and evaluate the results thus determined, except for using an apparatus having the following construction such as the opening and resin-impregnation apparatus (16) shown in FIG. 4 and that a glass fiber roving (2) ran in such a manner that it ran around the peripheral face of each fixed opening pin (4) in a zigzag pattern. As a result, it was found that fluffing was frequently observed at take-off speed of a reinforced rod (7) of 20 m/min and that the operation of the opening and resin-impregnation apparatus (16) became impracticable.

Incidentally, the circle depicted at the upper portion of the fixed opening pin (4) by a broken line in FIG. 4 indicates that the opening and resin-impregnation apparatus (16) of the present invention may be provided with the upper fixed opening pins (4u) arranged at desired spaces, at such positions. These results are summarized in Table 1.

Comparative Example 2

There was assembled a test apparatus (17) by removing all of the fixed opening pins (4) from the opening and resin-impregnation apparatus (11) as shown in FIG. 2, except for the turning pins (8) positioned at the most upstream side (or these pins may be transferred to positions locating far away from the glass fiber roving).

A continuous fiber-reinforced resin rod (7) was prepared according to the same procedures and conditions described in Example 2, except for using the test apparatus (17) shown in FIG. 4. There was not observed any fluffing of the glass fiber roving (2) during the operation of the apparatus (17), the connected portions of the roving (2) satisfactorily passed through the apparatus to thus give a continuous fiber-reinforced resin rod (7).

However, the resin-impregnation ability of the rod (7) was judged to be "bad" and the flexural strength thereof was found to be unsatisfied level on the order of 231 MPa, while only the stable productivity was judged to be "good". These results are summarized in Table 1.

Comparative Example 3

A continuous fiber-reinforced resin rod (7) was produced according to the same procedures and conditions used in Example 1, using a opening and resin-impregnation apparatus (18) which was mechanically similar to the apparatus (1) used in Example 1 except for setting the definition distances (H41, H42 and H43) between the upper and lower fixed opening pins (4u) and (4d), which made a pair, for the three paired fixed opening pins (41u and 41d; 42u and 42d; 43u and 43d) which were fitted to the apparatus (1) shown in FIG. 1 at a level of 0.1 mm (=6D). The resin-impregnation ability of this rod (7) was evaluated to be "excellent" and the flexural strength thereof was found to be 385 MPa, but the operation of the apparatus was insufficient since the stable productivity thereof was judged to be "bad" as will be detailed below. These results are summarized in Table 1.

When operating the foregoing apparatus (18), the glass fiber roving (2) introduced into the apparatus came in contact with at least one fixed opening pin (4) and there was observed severe fluffing of the roving (2). This would be ascribed to the fact that the foregoing minimum distance (H) is too small. Moreover, the connected portions of the roving (2) were disconnected from one another within the apparatus (18) and accordingly, there was observed such an accident that the roving should be replaced while temporarily stopping the apparatus.

Comparative Example 4

A continuous fiber-reinforced resin rod (7) was produced according to the same procedures and conditions used in Example 1, using a opening and resin-impregnation apparatus (19) which was mechanically similar to the apparatus (1) used in Example 1 except for setting the definition distances (H41, H42 and H43) between the upper and lower fixed opening pins (4u) and (4d), which made a pair, for the three paired fixed opening pins (41u and 41d; 42u and 42d; 43u and 43d) which were fitted to the apparatus (1) shown in FIG. 1 at a level of 10.2 mm (=600D).

The resin-impregnation ability of this rod (7) was evaluated to be "bad" and the flexural strength thereof was found to be 243 MPa, but only the stable productivity thereof was judged to be "excellent". These results are summarized in Table 1.

Comparative Example 5

A test apparatus (20) was assembled by removing the three upper fixed opening pins (41u, 42u and 43u) from the opening and resin-impregnation apparatus (1) as shown in FIG. 1. Then a continuous fiber-reinforced resin rod (7) was produced according to the same procedures and conditions used in Example 1, except that the opening and resin-impregnation apparatus (20) as shown in FIG. 4 was used and the production method was so designed that the glass roving (2) passed above the remaining fixed opening pins (41d, 42d and 43d).

The resulting rod (7) had a glass content of 61% by weight, the resin-impregnation ability thereof was judged to be "bad" and the flexural strength thereof was found to be 260 MPa, but the stable productivity was judged as "excellent". These results are summarized in Table 1.

In the operation using the foregoing test apparatus (20), there was not observed any fluffing of the roving (2) even when the take-off speed of the rod was set at a level of 30 m/min and the connected portions of the rovings satisfactorily passed through the apparatus (4) and the prescribed operation of the apparatus was completed.

TABLE 1

| | | | | | | | |
|---|---|---|---|---|---|---|---|
| | | | | | | C. | |
| | Opening and resin-impregnation apparatus | | | | | | |
| | Roving | | | Opening pin | | Polymer material | |
| Ex. No | Introduction and running directions | | Pair | H/D (ratio) | Angle of inclination (α°) | Kind | MFR g/10 min |
| Ex. 1 | Horizontal | Straight | 3 | 60 | 0 | MAH-PP | 130 |
| Ex. 2 | Off upper | Straight | 3 | 60 | 0 | MAH-PP | 130 |
| Ex. 3 | Horizontal | Straight | 3 | 60 | left 30 | MAH-PP | 130 |
| Ex. 4 | Horizontal | Straight | 3 | 30 | 0 | MAH-PP | 130 |
| Ex. 5 | Horizontal | Straight | 3 | 250 | 0 | MAH-PP | 130 |
| Ex. 6 | Horizontal | Straight | 3 | 460 | 0 | MAH-PP | 130 |
| Ex. 7 | Horizontal | Straight | 3 | 100 | 0 | MAH-PP | 130 |
| Ex. 8 | Horizontal | Straight | 3 | 60 | 0 | 6,6-NL | — |
| Ex. 9 | Horizontal | Straight | 4 | 85 | 0 | MAH-PP | 130 |
| Ex. 10 | Horizontal | Straight | 3 | 60 | 0 | MAH-PP | 130 |
| Comp. Ex. 1 | Horizontal | Zigzag | None | Outside Subject | Outside Subject | MAH-PP | 130 |
| Comp. Ex. 2 | Off upper | Straight | None | Outside Subject | Outside Subject | MAH-PP | 130 |
| Comp. Ex. 3 | Horizontal | Straight | 3 | 6 | 0 | MAH-PP | 130 |
| Comp. Ex. 4 | Horizontal | Zigzag | 3 | 600 | 0 | MAH-PP | 130 |
| Comp. Ex. 5 | Horizontal | Zigzag | None | Free of upper pin | Outside Subject | MAH-PP | 130 |

| | | | | | C. | | |
|---|---|---|---|---|---|---|---|
| | Conditions for operation | | Operation state | | Continuous fiber-reinforced resin structure | | |
| Ex. No | Opening and impregnation temperature (° C.) | Take-off speed m/min | Views of passage of connected portions | Stable productivity | Glass fiber content (wt %) | Resin impregnation ability | Flexural Strength MPa |
| Ex. 1 | 270 | 30 | Satisfactory | Excellent | 61 | Excellent | 398 |
| Ex. 2 | 270 | 30 | Satisfactory | Good | 61 | Excellent | 404 |
| Ex. 3 | 270 | 30 | Satisfactory | Excellent | 61 | Excellent | 392 |
| Ex. 4 | 270 | 30 | Satisfactory | Excellent | 61 | Excellent | 410 |
| Ex. 5 | 270 | 30 | Satisfactory | Excellent | 61 | Excellent | 388 |

TABLE 1-continued

| | | | | | | | |
|---|---|---|---|---|---|---|---|
| Ex. 6 | 270 | 35 | Satisfactory | Excellent | 61 | Good | 379 |
| Ex. 7 | 240 | 30 | Satisfactory | Excellent | 61 | Excellent | 390 |
| Ex. 8 | 300 | 30 | Satisfactory | Good | 56 | Excellent | 477 |
| Ex. 9 | 260 | 30 | Satisfactory | Excellent | 40 | Excellent | 201* |
| Ex. 10 | 270 | 30 | Satisfactory | Excellent | 60 | Excellent | 608** |
| Comp. Ex. 1 | 270 | <30 | — | Unacceptable | — | — | — |
| Comp Ex. 2 | 270 | 30 | Satisfactory | Good | 62 | Unacceptable | 231 |
| Comp. Ex. 3 | 270 | 30 | Detaching | Slightly bad | 61 | Bad | 385 |
| Comp. Ex. 4 | 270 | 30 | Satisfactory | Bad | 61 | Slightly bad | 253 |
| Comp. Ex. 5 | 270 | 30 | Satisfactory | Bad | 61 | Slightly bad | 260 |

H: The distance between the opening pins which make a pair;
D: Average diameter of single fibers consitituting glass fiber roving (in the present case 17 mm);
MAH-PP: Maleic anhydride-modified PP;
6,6-NL: 6,6-nylon (6,6-polyamide resin)
Connected portion: a portion in which glass fiber rovings were connected with each other
Detaching: Detaching of the connected portion of the glass fiber rovings
*: A value determined using test pieces (specimens), the stable productivity, resin-impregnation ability, flexural strength and views concerning the passage of the connected portions were determined and/or evaluated according to the description disclosed in this specification;
**: A measured value for laminated products.

Example 11

FIG. 4 is a schematic longitudinal sectional view of a multiple opening and resin-impregnation apparatus. There was used, as themultiple opening and resin-impregnation apparatus (1; a opening and resin-impregnation die), a multiple opening and resin-impregnation apparatus (1) having a width (length in the direction perpendicular to the longitudinal direction) of 200 mm and comprising a vessel having a box-like shape (whose cross section is a rectangular shape as shown in FIG. 4); three sets of fixed opening pins (4) arranged towards the downstream direction in which pins in each set are installed between the side walls (walls extending along the longitudinal direction; not shown) constituting the vessel and vertically arranged in 3 stages; and upper roving-supply nozzle (3u) and lower roving-supply nozzle (3d) arranged on the upstream end wall (1wL) in two stages. Twelve glass fiber rovings (4) were divided into two groups, one group thereof comprising 6 rovings horizontally arranged was introduced into the multiple opening and resin-impregnation apparatus (1) through the upper roving-supply nozzle (u), while the other group comprising 6 rovings likewise horizontally arranged was introduced into the apparatus through the lower roving-supply nozzle (d).

In the following description, the present invention will be explained while taking, as an example, an apparatus which comprises upper and lower, 2-stage, rovings ($2ul$ and $2dl$); upper and lower, 2-stage, roving-supply nozzles ($3u$ and $3d$); upper and lower, 2-stage, reinforcing strands ($7u$ and $7d$); and upper and lower, 2-stage, shape-determining nozzles ($6ul$ and $6dl$) formed on the downstream end wall (1wR) of the apparatus (1). More specifically, in the deeper part of the apparatus shown in FIG. 4, there are additionally present 5 series of upper and lower, 2-stage, rovings ($2u2$ to $2u6$ and $2d2$ to $2d5$); upper and lower, 2-stage, roving-supply nozzles ($3u2$ to $3u6$ and $3d2$ to $3d6$); upper and lower, 2-stage, reinforcing strands ($7u2$ to $7u6$ and $7d2$ to $7d6$); and upper and lower, 2-stage, shape-determining nozzles ($6u2$ to $6u6$ and $6d2$ to $6d6$) formed on the downstream end wall (1wR) of the apparatus (1).

However, only the forefront series thereof as shown in each figure will hereinafter be described in the present invention. This is because the situation is also true of the other 5 series and accordingly, the explanation of the latter will be omitted for preventing the redundancy of the explanation.

More particularly, the foregoing arrangement is as follows:

[Roving-Introducing Nozzle]: Among the upper roving-introducing nozzles (abbreviation: "upper nozzle"), shown in FIG. 4 is the upper nozzle ($3ul$) while the lower nozzle ($3dl$) is shown in this figure.

[Fixed Opening Pins]: The fixed opening pins (4) arranged in the foregoing pattern were composed of upper-stage fixed opening pins ($4ul$, $4u2$ and $4u3$); middle-stage fixed opening pins ($4ml$, $4m2$ and $4m3$); and lower-stage fixed opening pins ($4dl$, $4d2$ and $4d3$).

[Roving]: The foregoing glass continuous fiber roving (2) is roughly divided into two groups, i.e., upper-stage rovings ($2u$) and lower-stage rovings ($2d$) and those shown in FIG. 4 are the upper-stage roving ($2u1$) and the lower-stage roving ($2d1$).

To the apparatus (1), there was fed a molten thermoplastic resin formed in a melting and kneading device (not shown) such as an extruder through a molten resin-introduction opening (5) formed on the bottom plate (1wb) of the apparatus (1). The upper-stage roving ($2ul$) positioned in the upper-stage among the twelve rovings (2) introduced into the apparatus was passed through the space between the upper-stage fixed opening pin ($4u1$) and the middle-stage fixed opening pin ($4m1$) without coming in contact with both of these pins, while the lower-stage roving ($2dl$) positioned in the lower-stage was passed through the space between the middle-stage fixed opening pin ($4m1$) and the lower-stage fixed opening pin ($4d1$) without coming in contact with both of these pins.

Then, the filamentated products ($2u1$ and $2d1$) thus formed were impregnated with the molten resin to give composites (7; also referred to as "reinforced strand") comprising the continuous fibers (2) and the resin and the upper reinforced strand ($7u1$) positioned in the upper-stage and the lower reinforced strand ($7d1$) positioned in the lower-stage were recovered through the upper-stage shape-determining nozzle ($6u1$; inner diameter 2.4 mm) and the lower-stage shape-determining nozzle ($6d1$) positioned at the downstream end wall (1wR) of the multiple opening and resin-impregnation apparatus (1) using a take-off device (not shown) to thus give two reinforced strands, i.e., upper-stage and lower-stage reinforced strands (7u1) and (7d1).

In this regard, the apparatus is provided with one shape-determining nozzle per roving and those shown in FIG. 4 (the forefront nozzles of the apparatus shown in FIG. 4) correspond to the upper-stage and lower-stage shape-determining nozzles (6u1) and (6d1).

There was not observed any fluffing throughout the operation of the multiple opening and resin-impregnation apparatus (1) and the connected (entangled) portions of the first and second rolls of rovings also satisfactorily passed through the apparatus (the stable productivity thereof was judged as "excellent").

These upper-stage and lower-stage reinforced strands (7ud) were cut into small pieces to give reinforced pellets (having an average length of 10 mm).

The reinforced pellets (7) were used in injection molding to form specimens. When determining and evaluating the resin-impregnation ability of the reinforced strand (7) and the flexural strength of the specimen thus formed, there were obtained good results in that the former was judged to be "excellent" and the latter was found to be "215 MPa". These results are summarized in Table 2.

In this connection, the thermoplastic resin supplied from the extruder was a maleic anhydride-modified polypropylene [MFR (230° C.; 21.2N) 130 g/10 min]; the glass fiber roving (2) used was a product available from Nippon Electric Glass Co., Ltd. having an averaged single fiber diameter (D) of 17 μm and a tex of 2310 g/km; the space between the upper and lower fixed opening pins which make a pair (6 portions in all) was set at 1 mm (=60D); the multiple opening and resin-impregnation apparatus (1) was operated at a temperature of 270° C.; and the take-off speed of the resulting composite was adjusted to 30 m/min.

Example 12

The same procedures and conditions used in Example 11 were repeated except for using the multiple opening and resin-impregnation apparatus (11) shown in FIG. 5 to obtain a reinforced strand (7), followed by finely cutting the strand thus formed to give reinforced pellets (having an average length of 10 mm). More specifically, twelve (6 rovings for each stage) glass continuous fiber rovings (2u1 and 2d1) were introduced into the multiple opening and resin-impregnation apparatus (11) through the continuous fiber-supply opening (3) positioned on the upstream side of the top plate of the apparatus, followed by coming each roving in contact with the corresponding upstream turning pin (8u or 8d; there are two such pins positioned in the upper-and lower-stages within the apparatus) in such a manner that they ran around the lower side of each pin to thus convert the moving direction into the horizontal direction.

Subsequently, the rovings were treated by the same procedures used in Example 11 to give two reinforced strands (7u1 and 7d1). Although the rovings (2) always came in contact with the upstream turning pins throughout the operation of the apparatus, there was not observed any fluffing during the operation of the apparatus (1), and the connected (entangled) portions of the first and second rolls of the rovings (2) could satisfactorily pass through the apparatus (the stable productivity thereof was judged to be "good").

The resulting two reinforced strands (7u1 and 7d1) were inspected for the resin-impregnation ability and finely cut into pieces to give reinforced pellets, followed by injection-molding the reinforced pellets to give specimens (test pieces) and determination of the flexural strength thereof. As a result, good results were obtained, i.e., the former was judged to be "excellent" and the latter was found to be "222 MPa". These results are listed in the following Table 2.

Example 13

The multiple opening and resin-impregnation apparatus (12; also referred to as "opening and impregnation die") shown in FIG. 6 is such an aparatus that the apparatus (1) shown in FIG. 4 is further provided with upper and lower two downstream turning pins (9u1 and 9d1) vertically arranged downstream of the downstream terminal fixed opening pins.

Using the multiple apparatus (12), 12 glass fiber rovings (2) were divided into two upper and lower groups each comprising 6 rovings) and the rovings belonging to each group were arranged horizontally, followed by introduction of these groups into the multiple opening and resin-impregnation apparatus (12) through two upper-stage and lower-stage roving-introduction openings (3u1) and (3d1) formed on the upstream end wall (12wL) of the apparatus (12).

Subsequently, a melt of a maleic anhydride-modified polypropylene resin [MFR (230° C.; 21.2N) 130 g/10 min] prepared in a melting and kneading device (not shown) was introduced into the multiple apparatus (12) to thus subject the rovings to opening and resin-impregnation in the same manner in Example 11.

The space formed between upper and lower fixed opening pins (4ud), which made a pair (6 pairs in all), was set at 1 mm (=60D) for all of these pairs. In the foregoing multiple apparatus (12), the spaces between the upper-stage (relative relationship concerning the positions of pins) fixed opening pin and the lower-stage (relative relationship concerning the positions of pins) fixed opening pin (6 positions in all) were all set at a single value of 1 mm(=60D). This multiple apparatus (12) was operated at a temperature of 270° C. and a take-off speed of the resulting reinforced strand (71) of 30 m/min.

One roll of the foregoing glass continuous fiber roving (2) would be consumed within about 4 hours and accordingly, a second roll of the roving (2) was provided.

More specifically, the end portion of the roving (2) during processing was connected to the initial end of the second roving (2) through entangling at an instance when the first roving came up to its terminal point to thus continue the operation of the apparatus.

There was not observed any fluffing throughout the operation of the apparatus in this Example 13 and the connected portions between the successive two rovings could satisfactorily pass through the multiple apparatus (12) (i.e., the stable productivity thereof was judged to be "good").

The moving direction of these upper-stage and lower-stage continuous fiber composite materials (2u1 and 2d1) which had been subjected to opening and impregnation with the molten resin in the apparatus (12) was changed by bringing them into contact with the surface of each corresponding upper or lower downstream turning pin (9u1 or 9d1) arranged between the final fixed opening pin and the shape-determining nozzle (61; inner diameter 6.3 mm) downstream of the pin to thus converge these composites on the same shape-determining nozzle (61).

The resulting single reinforced strand (71; reinforced rod) had a glass continuous fiber content of 60% by weight. This reinforced rod (71) was inspected for the resin-impregnation ability and the flexural strength without subjecting it to any treatment.

Thus, the reinforced rod was inspected or evaluated for the resin-impregnation ability and the flexural strength and as a result, good results were obtained, i.e., the former was judged as "excellent" and the latter was found to be "403 MPa". These results are listed in the following Table 2.

Example 14

The multiple opening and resin-impregnation apparatus (13) used in this Example was such an apparatus that, in the multiple apparatus (1) shown in FIG. 5, three fixed opening pins (4u1, 4u2 and 4u3) systematically arranged in the upper-stage and three fixed opening pins (4d1, 4d2 and 4d3) systematically arranged in the lower-stage are horizontally shifted towards the downstream direction of the apparatus (1) and that all of the intersectional angles ($\alpha$) formed between the line connecting the centers of the upper-stage and lower-stage fixed opening pins (4u) and (4d) and a line perpendicular to the running direction of the continuous fiber (2) (3 portions in all) were set at +40° (the counter-clockwise direction is represented by "+" in the figure).

The same procedures and conditions used in Example 11 were repeated except for using this multiple apparatus (13) to give two upper-stage and lower-stage reinforced strands (7u1 and 7d1), followed by finely cutting them to give reinforced pellets (7; having an average length of 10 mm). The reinforced pellets (7) were subjected to injection-molding in the same manner in Example 11 to give specimens.

The strand (7) was inspected for the resin-impregnation ability, the resulting specimen was inspected for the flexural strength and these results were evaluated. As a result, good results were obtained, i.e., the former was judged to be "excellent" and the latter was found to be "200 MPa". These results are summarized in the following Table 2.

There was not observed any fluffing throughout the operation of the multiple opening and resin-impregnation apparatus (13) and the connected portions of the glass continuous fiber rovings (2) could satisfactorily pass through the multiple apparatus (13) (i.e., the stable productivity was evaluated as "excellent").

Example 15

The multiple opening and resin-impregnation apparatus (14) used in this Example was such an apparatus that, in the multiple apparatus (1) as shown in FIG. 5, the space (clearance) between the upper-stage and lower-stage fixed opening pins or, for instance, the space (Hu1) between the upper-stage and middle-stage fixed opening pins (4u1) and (4m1) or the space (Hd1) between the middle-stage and lower-stage fixed opening pins (4m1) and (4d1) (6 portions in all) was set at a level of 0.5 mm (=30D).

The same procedures and conditions used in Example 11 were repeated except for using this multiple apparatus (14) to give two upper-stage and lower-stage reinforced strands (7u1 and 7d1), followed by finely cutting them to give reinforced pellets (7; having an average length of 10 mm). The reinforced pellets (7) were subjected to injection-molding in the same manner as in Example 11 to give specimens.

The strand (7) was inspected for the resin-impregnation ability and the resulting specimen was inspected for the flexural strength and these results were evaluated. As a result, good results were obtained, i.e., the former was judged to be "excellent" and the latter was found to be "224 MPa". These results are summarized in the following Table 2.

There was not observed any fluffing throughout the operation of the multiple opening and resin-impregnation apparatus (14) and the connected portions of each of these two upper and lower-stage glass continuous fiber rovings (2u1 and 2d1) could satisfactorily pass through the multiple apparatus (14) (i.e., the stable productivity was evaluated as "excellent").

Example 16

The multiple opening and resin-impregnation apparatus (15) used in this Example was such an apparatus that, in the multiple apparatus (1) as shown in FIG. 5, the space (H) between the upper-stage and lower-stage fixed opening pins, i.e. the space (Hu1) between the upper-stage and middle-stage fixed opening pins (4u1) and (4m1) or the space (Hd1) between the middle-stage and lower-stage fixed opening pins (4m1) and (4d1) (6 portions in all) was set at a level of 4.3 mm (=250D). The same procedures and conditions used in Example 11 were repeated except for using this multiple apparatus (15) to give two, i.e., upper-stage and lower-stage reinforced strands (7u1 and 7d1), followed by finely cutting them to give reinforced pellets (having an average length of 10 mm).

The reinforced pellets (7) were subjected to injection-molding in the same manner as in Example 11 to give specimens. The strand (7) was inspected for the resin-impregnation ability, the resulting specimen was inspected for the flexural strength and these results were evaluated. As a result, good results were obtained, i.e., the former was judged to be "excellent" and the latter was found to be "210 MPa".

There was not observed any fluffing throughout the operation of the multiple opening and resin-impregnation apparatus (15) and the connected portions of the glass continuous fiber rovings (2) could satisfactorily pass through the multiple apparatus (15), i.e., the stable productivity was evaluated as "excellent". These results are summarized in the following Table 2.

Example 17

The multiple opening and resin-impregnation apparatus (16) used in this Example was such an apparatus that, in the multiple apparatus (1) as shown in FIG. 5, the space (Hu1 and Hd1) between the upper-stage and lower-stage fixed opening pins (6 portions in all) was set at a level of 6.8 mm (=400D). The same procedures and conditions used in Example 11 were repeated except for using this multiple apparatus (16) to give two, i.e., upper-stage and lower-stage reinforced strands (7u1 and 7d1), followed by finely cutting them to give reinforced pellets (having an average length of 10 mm).

The reinforced pellets (7) were subjected to injection-molding in the same manner as in Example 11 to give specimens. The strand (7) was inspected for the resin-impregnation ability and the resulting specimen was inspected for the flexural strength and these results were evaluated. As a result, good results were obtained, i.e., the former was judged to be "good" and the latter was found to be "197 MPa".

There was not observed any fluffing throughout the operation of the multiple opening and resin-impregnation apparatus (16) and the connected portions of the glass continuous fiber rovings (2) could satisfactorily pass through the multiple apparatus (15), i.e., the stable productivity was evaluated as "excellent". These results are summarized in the following Table 2.

Comparative Example 6

Figure 9:
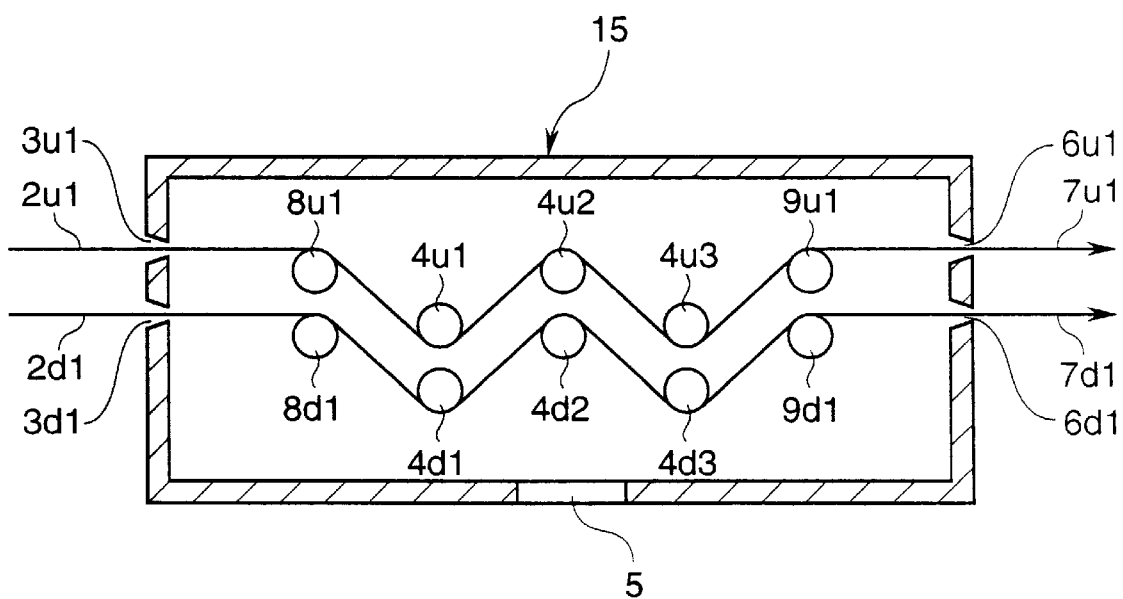
FIG. 9 is a schematic longitudinal sectional view of a conventional opening and resin-impregnation apparatus, according to another embodiment, for producing resin-impregnated structures reinforced by continuous fibers according to the method of the Comparative Example.

It was tried to obtain upper-stage and lower-stage reinforced strands (7u1 and 7d1) according to the same procedures and conditions used in Example 11 except for using a multiple opening and resin-impregnation apparatus (17) as shown in FIG. 9 which was an approximately box-like shape. More specifically, the multiple apparatus (17) has a width (the length in the direction perpendicular to the running direction of the continuous fiber in a horizontal plane) of 200 mm and is provided with upper and lower, two-stage fixed opening pins (4u and 4d) which are installed between the right hand side wall (not shown) and the left hand side wall (not shown) and are arranged within these two side walls in a zigzag pattern. However, the stable productivity of the resulting strand was judged to be "unacceptable" because of the following reasons.

Composite materials comprising the foregoing upper and lower, two-stage continuous fiber reinforcing materials (2u1 and 2d1) and a resin were taken off through the upper and lower, two-stage shape-determining nozzles (17u1 and 17d1), respectively, formed on the downstream end wall (17wR) of the multiple opening and resin-impregnation apparatus (17) to thus give reinforced strands (7u1 and 7d1). In this connection, the take-off speed of the strands were set at 30 m/min. However, the tension applied to the continuous fiber rovings (2u1 and 2d1) became extremely high and accordingly, fluffing of the rovings occurred frequently and the apparatus could not be operated within a short period of time.

Therefore, the resin-impregnation ability and the flexural strength could not be determined. These results are summarized in the following Table 2.

Comparative Example 7

Figure 10:
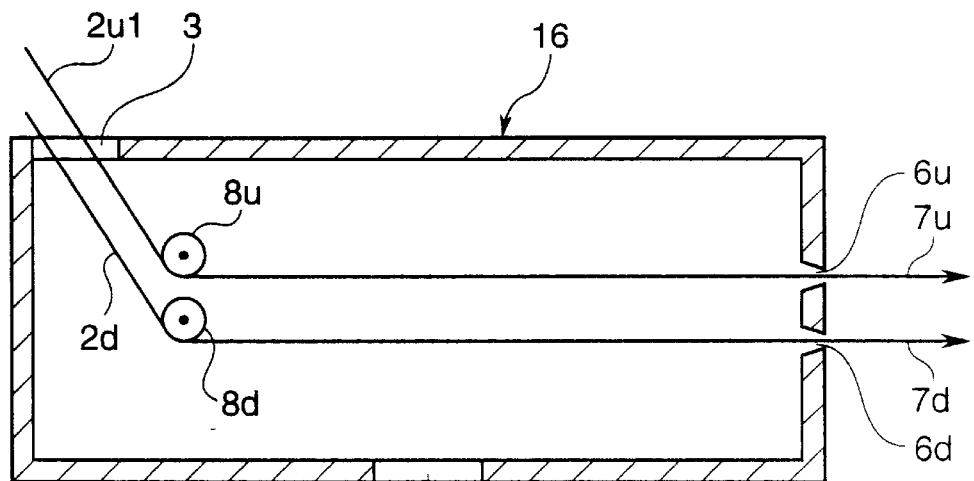
FIG. 10 is a schematic longitudinal sectional view of a conventional opening and resin-impregnation apparatus, according to a still another embodiment, for producing resin-impregnated structures reinforced by continuous fibers according to the method of the Comparative Example.

Upper and lower, two-stage reinforced strands (7u1 and 7d1) were produced by repeating the same procedures and conditions used in Example 12 with using a multiple opening and resin-impregnation apparatus (18) which was such an apparatus that, in the multiple apparatus (11), all of the fixed opening pins (4) were removed while remaining the two turning pins (8u1 and 8d1) on the upstream side as shown in FIG. 10, followed by finely cutting the reinforced strands to give reinforced pellets (7). The resulting reinforced pellets (7) were used in injection-molding to thus produce test pieces by repeating the same procedures and conditions used in Example 11. The resin-impregnation ability and the flexural strength thereof were determined and evaluated.

The fluffing was not so conspicuous during the production of the reinforced strand (7) and the connected portions of the rovings (2) could satisfactorily pass through the multiple apparatus, i.e., the stable productivity was judged to be "good". However, the resin-impregnation ability of the resulting reinforced strand (7) was ranked as "unacceptable" and the flexural strength thereof was found to be "121 MPa" which did not reach the desired level. These results are summarized in the following Table 2.

Comparative Example 8

Figure 11:
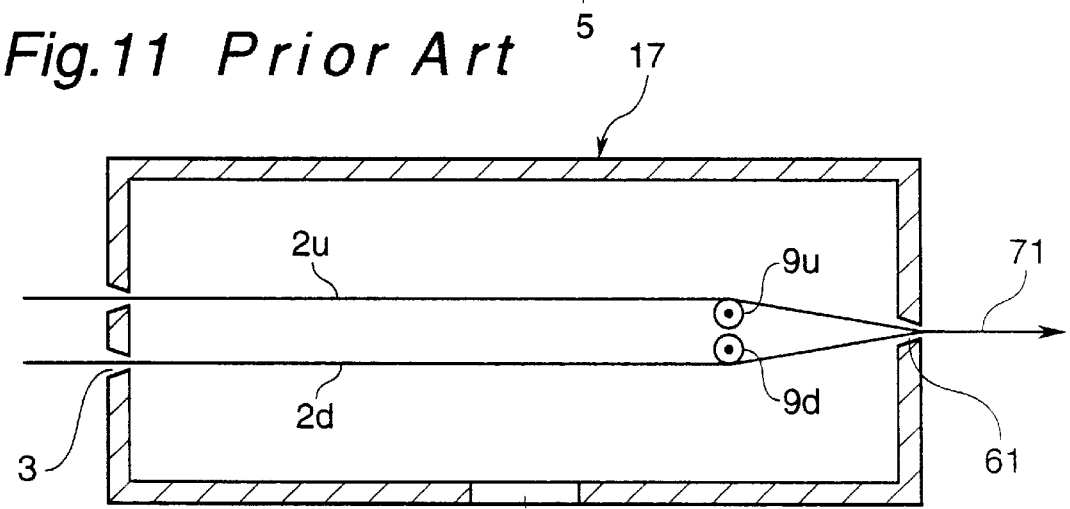
FIG. 11 is a schematic longitudinal sectional view of a conventional opening and resin-impregnation apparatus, according to a still further embodiment, for producing a resin-impregnated structure reinforced by continuous fibers, which is reinforced with uni-directionally arranged continuous fibers and produced by the method of the Comparative Example.

A reinforced strand (71; forefront strand shown in the figure) was produced by repeating the same procedures and conditions used in Example 12 with using a multiple opening and resin-impregnation apparatus (19) which was such an apparatus that in the multiple apparatus (12), all of the fixed opening pins (4) were removed while remaining the two turning pins (9u and 9d) on the downstream side as shown in FIG. 11. The resin-impregnation ability and the flexural strength of the resulting reinforced rod (71) were determined and evaluated. The results thus obtained are summarized in the following Table 2.

The fluffing was not so conspicuous during the production of the reinforced strand (7) and the connected portions of the rovings (2) could satisfactorily pass through the multiple apparatus, i.e., the stable productivity was judged to be "good". However, the resin-impregnation ability of the resulting reinforced rod (7) was found to be insufficient and the flexural strength thereof was found to be "251 MPa" which did not reach the desired level.

Comparative Example 9

Upper and lower, two-stage reinforced strands (7u1 and 7d1) were produced by repeating the same procedures and conditions used in Example 11 with using a multiple opening and resin-impregnation apparatus (20) which was such an apparatus that, in the multiple apparatus (1) used in Example 10, the spaces (Hu1 and Hd1) between the upper-stage fixed opening pin and the lower-stage fixed opening pin which made a pair were all set at 0.1 mm (=6D). The resulting reinforced strands were finely cut into reinforced pellets (7), followed by subjecting the reinforced pellets (7) to injection-molding to thus produce specimens according to the same procedures and conditions used in Example 11.

The resin-impregnation ability of the reinforced strands (7) and the flexural strength of the resulting specimen were determined and evaluated. Thus, good results were obtained, i.e., the former was judged to be "excellent" and the latter was found to be "216 MPa", but the stable productivity thereof was ranked as "not good". The results thus obtained are summarized in the following Table 2.

The fluffing occurred frequently since the roving (2) frequently came in contact with the fixed opening pins (4) during the production of the foregoing reinforced strand (7). Moreover, the connected portions of the rovings (2) caused detaching in the multiple apparatus and as a result, the operation of the multiple apparatus should be once stopped in order to replace the rovings.

Comparative Example 10

Upper and lower, two-stage reinforced strands (7) were produced by repeating the same procedures and conditions used in Example 10 with using a multiple opening and resin-impregnation apparatus (21) which was such an apparatus that, in the multiple apparatus (1) used in Example 11, the spaces (Hu1 and Hd1) between the upper-stage fixed opening pin and the lower-stage fixed opening pin which made a pair were all set at 10.2 mm (=600D). The resulting reinforced strand was finely cut into reinforced pellets (7), followed by subjecting the reinforced pellets (7) to injection-molding to thus produce specimens in the same procedures and conditions used in Example 11.

The resin-impregnation ability of the reinforced strands (7) and the flexural strength of the specimen prepared from the reinforced pellets (7) were determined and evaluated. Thus, the former was judged to be "not good" and the latter was found to be "138 MPa", but the stable productivity thereof was ranked as "excellent". The results thus obtained are summarized in the following Table 2.

The roving (2) did not come in contact with the fixed opening pins (4) at all during the production of the foregoing reinforced strand (7). As a result, there was not observed any fluffing and the connected portions of the rovings (2) could satisfactorily pass through the multiple opening and resin-impregnation apparatus. However, the reason why the resulting reinforced strand (7) was insufficient in the resin-impregnation ability can be ascribed to the fact that the distance between the upper and lower stages of the fixed opening pins within the multiple apparatus (21) is too broad.

Comparative Example 11

Figure 12:
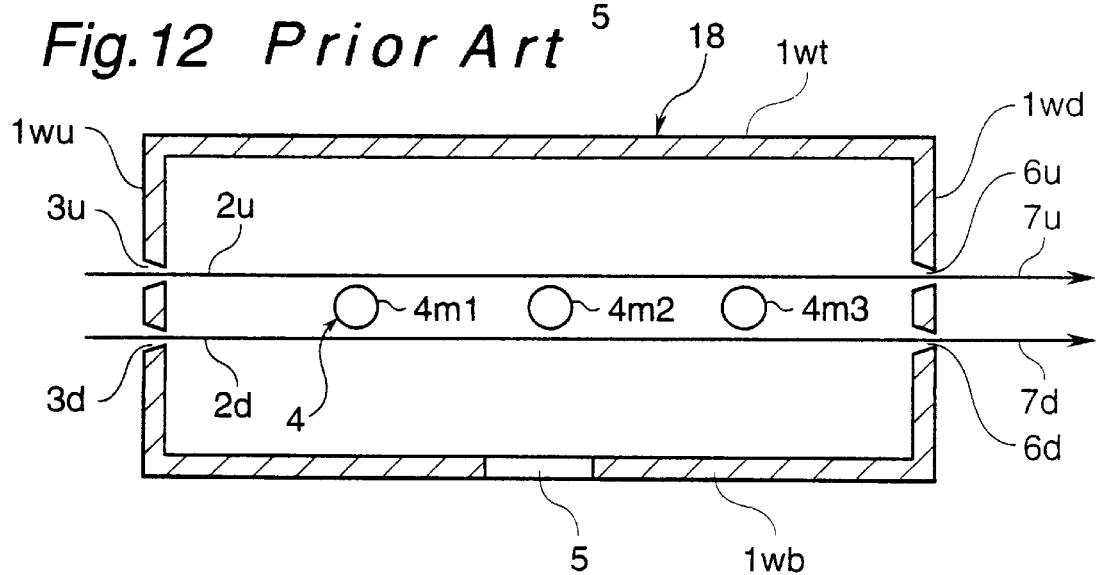
FIG. 12 is a schematic longitudinal sectional view of a conventional opening and resin-impregnation apparatus, according to a further embodiment, for producing resin-impregnated structures reinforced by continuous fibers according to the method of the Comparative Example.

The multiple opening and resin-impregnation apparatus (22) used in this Example was such an apparatus that in the multiple apparatus (1) as shown in FIG. 12, the upper and lower of the fixed opening pins (4u and 4d; 6 pins in all) were all removed while remaining three middle-stage fixed opening pins (4m1, 4m2 and 4m3) which were sandwiched between the upper-stage and lower-stage continuous fiber rovings (2u1) and (2d1).

Upper and lower-stage reinforced strands (7u1 and 7d1) were produced by repeating the same procedures and conditions used in Example 12 except for using the foregoing multiple apparatus (22). The resulting reinforced strands were finely cut into reinforced pellets (7) (average length: 10 mm), followed by subjecting the reinforced pellets (7) to injection-molding to thus produce specimens according to the same procedures used in Example 11 under the same conditions used therein.

The resin-impregnation ability of the resulting reinforced strands (7) and the flexural strength of the specimen were determined and evaluated. As a result, the former was ranked as "not good" and the latter was found to be "129 MPa". On the other hand, the stable productivity thereof was judged to be "excellent". The results thus obtained are summarized in the following Table 2.

TABLE 2

| | Structure of multiple apparatus & roving-introduction system | | | | | | | | |
|---|---|---|---|---|---|---|---|---|---|
| | Upstream | Opening pin | | | | | Downstream | Roving | |
| | side turning pin | Pins/ stage | No. of st. | H/D | Arrangement of pins | α° | side turning pin | Pins/ stage | No. of stage |
| Ex. 11 | None | 3 | 3 | 60 | horizontal | — | None | 6 | 2 |
| Ex. 12 | upper 1; lower 1 | 3 | 3 | 60 | horizontal | — | None | 6 | 2 |
| Ex. 13 | None | 3 | 3 | 60 | horizontal | — | upper 1; lower 1 | 6 | 2 |
| Ex. 14 | None | 3 | 3 | 60 | horizontal | 40 | None | 6 | 2 |
| Ex. 15 | None | 3 | 3 | 30 | horizontal | — | None | 6 | 2 |
| Ex. 16 | None | 3 | 3 | 250 | horizontal | — | None | 6 | 2 |
| Ex. 17 | None | 3 | 3 | 400 | horizontal | — | None | 6 | 2 |
| Comp. Ex. 1 | — | 5 | 1 | — | Zigzag | — | — | 12 | 1 |
| Comp. Ex. 6 | — | 5 | 2 | — | Zigzag | — | — | 6 | 2 |
| Comp. Ex. 7 | Upper 1, Lower 1 | — | — | — | — | — | None | 6 | 2 |
| Comp. Ex. 8 | None | — | — | — | — | — | Upper 1, Lower 1 | 6 | 2 |
| Comp. Ex. 9 | None | 3 | 3 | 6 | Horizontal | — | None | 6 | 2 |
| Comp. Ex. 10 | None | 3 | 3 | 600 | Horizontal | — | None | 6 | 2 |
| Comp. Ex. 11 | None | 3 | 1 | — | Horizontal | — | None | 6 | 2 |

| | Physical properties of continuous fiber reinforced material | | | |
|---|---|---|---|---|
| | Stable productivity | Resin impregnation ability (STRAND) | Flexural strength | |
| | | | (STRAND) | (Pellet) |
| Ex. 11 | Excellent | Excellent | Not determined | 215 |
| Ex. 12 | Good | Excellent | Not determined | 222 |
| Ex. 13 | Good | Excellent | 403 | Not determined |
| Ex. 14 | Excellent | Excellent | Not determined | 200 |
| Ex. 15 | Excellent | Excellent | Not determined | 224 |
| Ex. 16 | Excellent | Excellent | Not determined | 210 |
| Ex. 17 | Excellent | Good | Not determined | 197 |
| Comp. Ex. 1 | Unacceptable | —*1 | —*1 | —*1 |
| Comp. Ex. 6 | Unacceptable | —*1 | —*1 | —*1 |
| Comp. Ex. 7 | Good | Unacceptable | Not determined | 121 |
| Comp. Ex. 8 | Good | Unacceptable | 251 | Not determined |
| Comp. Ex. 9 | Slightly bad | Excellent | Not determined | 216 |

TABLE 2-continued

| | | | | |
|---|---|---|---|---|
| Comp. Ex. 10 | Excellent | Slightly bad | Not determined | 138 |
| Comp. Ex. 11 | Excellent | Slightly bad | Not determined | 129 |

Note:
*[1]means that the property could not be determined since any molded article could not be obtained, while "Not Determined" means that each molded article could be produced, but each corresponding property was not determined.

We claim:

1. A method for producing a resin-impregnated structure reinforced by substantially unidirectionally aligned continuous fibers, the method comprising subjecting a substantially endless continuous fiber bundle to opening and impregnation with a molten resin, wherein
    the continuous fiber bundle is dipped in a bath of molten resin and then passes through a space between a pair of opening pins in the bath, the pins being positioned on sides of the bundle so that the continuous fibers are sandwiched by the pins without coming into contact with either of the pins to thus subject the fibers of the bundle to opening and impregnation with the resin.

2. The method as set forth in claim 1 wherein the pair of opening pins comprise an upper-stage opening pin and a lower-stage opening pin, and wherein the space (H) between the upper and lower-stage opening pins and the average diameter (D) of individual fibers constituting the continuous fiber bundle satisfy the following relation:

$10D \leq H \leq 500D$.

3. The method of claim 2 wherein the opening pins comprise an upper-stage opening pin and a lower-stage opening pin, and wherein the space (H) is between the upper and lower-stage opening pins and the average diameter (D) of individual fibers constituting the continuous fiber bundle satisfy the following relation $20D \leq H \leq 300D$.

4. The method of claim 1 wherein the opening pins comprise an upper-stage opening pin and a lower-stage opening pin, and wherein the space (H) between the upper and lower-stage opening pins and the average diameter (D) of individual fibers constituting the continuous fiber bundle satisfy the following relation:

$20D \leq H \leq 300D$.

5. A method for producing a columnar product composed of a resin-impregnated structure reinforced by substantially uni-directionally aligned continuous fibers, said method comprising subjecting a substantially endless continuous fiber bundle to opening and impregnation with a molten resin, wherein the continuous fiber bundle is dipped in a bath of a molten resin and simultaneously passes through a space between a pair of opening pins positioned on sides of the bundle so that the continuous fiber bundle is sandwiched by the pins without coming in contact with either of the pins to obtain a resin-impregnated structure reinforced with uni-directionally arranged continuous fibers; and cutting the resulting resin-impregnated structure into pieces having a desired length.

6. An apparatus for producing a resin-impregnated structure reinforced by uni-directionally arranged continuous fibers and having a resin penetrating between the fibers, wherein the apparatus comprises:

a zone through which a molten resin formed from a molten resin-supply system flows, said molten resin being supplied to the zone through a pore and stored therein in a predetermined amount;

an opening for introducing continuous fiber bundles, the opening positioned on an end wall or a top plate on an upstream side of the zone;

at least one pair of opening pins which are approximately vertically positioned within the zone at a predetermined space so that the continuous fiber bundle introduced into the zone is immersed in the molten resin and can pass through a space formed between the pair of pins without coming in contact with the pins;

a shape-determining nozzle positioned on a downstream side and along the moving direction of the continuous fiber bundle to draw the fiber bundle passing out of the zone, the bundle being introduced through a nozzle opening while passing through the space between the opening pins without coming in contact with the pins; and a take-off system for the continuous fiber-reinforced resin structure drawn from the shape-determining nozzle.

7. The production apparatus of claim 6 wherein the at least one pair of opening pins comprise an upper-stage opening pin and a lower stage openining pin and the at least one pair of opening pins are provided at not less than three positions arranged along the direction starting from the continuous fiber-introducing side towards the downstream side.

8. The production apparatus of claim 7 wherein the space (H) between the upper and lower-stage opening pins and the average diameter (D) of individual fibers constituting the continuous fiber bundle satisfy the following relation:

$10D \leq H \leq 500D$.

9. The production apparatus of claim 7 wherein the space (H) between the upper and lower-stage opening pins and the average diameter (D) of individual fibers constituting the continuous fiber bundle satisfy the following relation:

$20D \leq H \leq 300D$.

10. The production apparatus of claim 6 wherein the space (H) between the upper and lower-stage opening pins and the average diameter (D) of individual fibers constituting the continuous fiber bundle satisfy the following relation:

$10D \leq H \leq 500D$.

11. The production apparatus of claim 6 wherein the space (H) between the upper and lower-stage opening pins and the average diameter (D) of individual fibers constituting the continuous fiber bundle satisfy the following relation:

$20D \leq H \leq 300D$.

12. The production apparatus of claim 6 wherein at least three opening pins are approximately vertically arranged to form a group of opening pins and the group of opening pins are provided at not less than three positions arranged along the direction starting from the continuous fiber-introducing side towards the downstream side.

13. The production apparatus of claim 12 wherein the space (H) between two fixed opening pins in the group of the fixed opening pins, through which the continuous fiber bundle passes, and the average diameter (D) of individual fibers constituting the continuous fiber bundle satisfy the following relation:

$$10D \leq H \leq 500D.$$

14. The production apparatus of claim 12 wherein the space (H) between two fixed opening pins in the group of the fixed opening pins, through which the continuous fiber bundle passes, and the average diameter (D) of individual fibers constituting the continuous fiber bundle satisfy the following relation:

$$20D \leq H \leq 300D.$$

15. An apparatus for producing a continuous resin-impregnated structure reinforced by uni-directionally arranged continuous fibers and having a resin penetrating between the fibers, wherein the apparatus comprises:

a zone through which a molten resin formed from a molten resin-supply system flows, said molten resin being supplied to the zone through a pore and stored therein in a predetermined amount;

at least two openings for introducing continuous fiber bundles, the openings positioned on an end wall or a top plate arranged on the upstream side of the zone;

at least three opening pins which are approximately perpendicularly positioned within the zone at predetermined spaces to form a group of fixed opening pins so that the continuous fiber bundles introduced into the zone are immersed in the molten resin and pass through a space formed between the pins without coming in contact with the pins;

a shape-determining nozzle positioned on a downstream side and along the moving direction of the continuous fiber bundles so as to draw the fiber bundles passing out of the zone, the fiber bundles being introduced through nozzle openings while passing through the spaces between the opening pins without coming into contact with the pins; and a take-off system for the continuous fiber-reinforced resin structure drawn from the shape-determining nozzle.

16. The production apparatus of claim 15 wherein the space (H) between two fixed opening pins in the group of the fixed opening pins, through which the continuous fiber bundle passes, and the average diameter (D) of individual fibers constituting the continuous fiber bundle satisfy the following relation:

$$10D \leq H \leq 500D.$$

17. The production apparatus of claim 15 wherein the space (H) between two fixed opening pins in the group of the fixed opening pins, through which the continuous fiber bundle passes, and the average diameter (D) of individual fibers constituting the continuous fiber bundle satisfy the following relation:

$$20D \leq H \leq 300D.$$

* * * * *

UNITED STATES PATENT AND TRADEMARK OFFICE
CERTIFICATE OF CORRECTION

PATENT NO. : 5,948,473
DATED : September 7, 1999
INVENTOR(S) : SAITO et al.

It is certified that error appears in the above-identified patent and that said Letters Patent is hereby corrected as shown below:

Column 42, line 24, change "10D—H—500D" to --$10D \leq H \leq 500D$--.

Signed and Sealed this

Thirteenth Day of June, 2000

Attest:

Q. TODD DICKINSON

*Attesting Officer*     *Director of Patents and Trademarks*